US010949325B1

(12) United States Patent
Culibrk et al.

(10) Patent No.: US 10,949,325 B1
(45) Date of Patent: Mar. 16, 2021

(54) AUTOMATED CROSS-SESSION VIDEO GAME TESTING

(71) Applicant: Electronic Arts Inc., Redwood City, CA (US)

(72) Inventors: Milan Culibrk, Coquitlam (CA); Newman Scott Hunter, Vancouver (CA); Martin Talbot, Vancouver (CA); Andrew Gearhart, Vancouver (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 101 days.

(21) Appl. No.: 15/681,258

(22) Filed: Aug. 18, 2017

(51) Int. Cl.
| | |
|---|---|
| *H04N 21/234* | (2011.01) |
| *G06N 20/00* | (2019.01) |
| *G06F 11/36* | (2006.01) |
| *A63F 13/30* | (2014.01) |
| *A63F 13/25* | (2014.01) |

(52) U.S. Cl.
CPC .......... *G06F 11/3612* (2013.01); *A63F 13/25* (2014.09); *A63F 13/30* (2014.09)

(58) Field of Classification Search
CPC ....... G06F 11/3612; A63F 13/25; A63F 13/30
USPC .................................................. 717/100–168
See application file for complete search history.

(56) References Cited

U.S. PATENT DOCUMENTS

| | | | |
|---|---|---|---|
| 8,719,791 B1 | 5/2014 | MacPherson et al. | |
| 8,997,061 B1 * | 3/2015 | Davison | G06F 11/3688 717/124 |
| 9,009,539 B1 | 4/2015 | Kompotis et al. | |
| 9,245,117 B2 | 1/2016 | Weaver et al. | |
| 10,282,280 B1 | 5/2019 | Gouskova et al. | |
| 2003/0005044 A1 | 1/2003 | Miller et al. | |
| 2005/0138104 A1 | 6/2005 | Houh et al. | |
| 2007/0233497 A1 * | 10/2007 | Paek | G10L 15/22 704/270 |
| 2009/0027402 A1 | 1/2009 | Bakalash et al. | |
| 2009/0070746 A1 | 3/2009 | Dhurjati et al. | |
| 2009/0113251 A1 | 4/2009 | Goossen et al. | |
| 2009/0113303 A1 | 4/2009 | Goossen et al. | |
| 2010/0144443 A1 * | 6/2010 | Graham | A63F 13/60 463/42 |

(Continued)

OTHER PUBLICATIONS

Sanjay Zalavadia, How to use predicitve analytics to optimize software delivery, Mar. 21, 2017. (Year: 2017).*

(Continued)

*Primary Examiner* — Chat C Do
*Assistant Examiner* — Noor Alkhateeb
(74) *Attorney, Agent, or Firm* — Knobbe Martens Olson & Bear LLP

(57) ABSTRACT

Embodiments disclosed herein include a system that is capable of processing test data across multiple sessions of a video game. In some cases, the tests are performed over multiple video games that share a game engine. The generated test data may be analyzed as the test is being performed and key performance indicators may be extracted from the test data reducing the test data by at least an order of magnitude. Further, the extracted key performance indicators are used to automatically conduct further testing, such as regression testing, based on an analysis of the key performance indicators with respect to trend data generated from prior tests of the video game or of a shared game engine used by multiple video games.

17 Claims, 9 Drawing Sheets

(56) References Cited

U.S. PATENT DOCUMENTS

| | | |
|---|---|---|
| 2010/0144444 A1 | 6/2010 | Graham |
| 2012/0204153 A1 | 8/2012 | Peterson et al. |
| 2012/0209571 A1* | 8/2012 | Peterson ............. G06F 11/3616 702/186 |
| 2012/0311387 A1 | 12/2012 | Santhosh et al. |
| 2013/0205286 A1 | 8/2013 | Barraclough et al. |
| 2016/0041894 A1 | 2/2016 | Reid, III et al. |
| 2016/0179659 A1* | 6/2016 | Champlin-Scharff ....................... G06F 17/271 717/126 |
| 2016/0262680 A1 | 9/2016 | Martucci et al. |
| 2016/0283353 A1 | 9/2016 | Owen et al. |
| 2017/0123961 A1 | 5/2017 | Cerny et al. |
| 2017/0147470 A1 | 5/2017 | Bloching et al. |
| 2017/0201779 A1 | 7/2017 | Publicover et al. |
| 2017/0230417 A1 | 8/2017 | Amar et al. |
| 2017/0259177 A1 | 9/2017 | Aghdaie et al. |
| 2017/0322917 A1* | 11/2017 | Goyal ................ G06Q 30/0242 |
| 2017/0339037 A1 | 11/2017 | Cheh et al. |
| 2018/0165723 A1* | 6/2018 | Wright ............... G06Q 10/0635 |
| 2018/0275989 A1* | 9/2018 | Kakkad ............... G06F 11/3409 |
| 2018/0293158 A1* | 10/2018 | Baughman .......... G06F 11/3672 |
| 2020/0089594 A1 | 3/2020 | Zhou et al. |

OTHER PUBLICATIONS

Borovikov, et al., From Demonstrations and Knowledge Engineering to a DNN Agent in a Modern Open-World Video Game, Presentation Slides, 2019.

Borovikov, et al., From Demonstrations and Knowledge Engineering to a DNN Agent in a Modern Open-World Video Game, Published Apr. 26, 2019.

Borovikov, et al., Imitation Learning via Bootstrapped Demonstrations in an Open-World Video Game, Dec. 2018.

Borovikov, et al., Towards a Representative Metric of Behavior Style in Imitation and Reinforcement Learning, 23rd Annual Signal and Image Sciences Workshop at Lawrence Livermore National Laboratory (LLNL), Center for Advanced Signal Image Sciences (CASIS). May 15, 2019.

Borovikov, et al., Towards Interactive Training of Non-Player Characters in Video Games, Jun. 3, 2019.

Borovikov, et al., Towards Interactive Training of Non-Player Characters in Video Games, Presentation Slides, Jun. 14, 2019.

Zhao, et al., Winning Isn't Everything: Enhancing Game Development with Intelligent Agents, Aug. 20, 2019.

* cited by examiner

AUTOMATED CROSS-SESSION VIDEO GAME TESTING

BACKGROUND

Many video games are complex software applications that utilize a significant percentage of a computer system's resources. Each year the complexity of many of the latest video games pushes the boundaries of the latest computing systems. Modern video games comprise millions of lines of code. Testing the code of such large applications can be a time consuming and challenging process. Further, because video games are often programmed by teams of developers, changes made by one developer or team of developers working on one portion of the video game may impact code developed by another developer or team of developers working on another portion of the video game. Thus, code must often be tested and retested repeatedly as changes are made to the code by different teams.

Some video games are developed using a framework of reusable software components, which is sometimes termed a "game engine." Using the game engine to develop the video game can help reduce development time and resources required to create a video game because existing software components can be reused in the creation of the video game. However, learning to efficiently use the game engine can be challenging for new developers. Further, different types of video games may use the game engine in different ways. Thus, what may be the most efficient way to utilize the game engine for one type of video game may not be the most efficient way to use the game engine for another type of video game. Moreover, the game engine itself may evolve over time. Thus, a developer may need to learn new ways to optimize use of the game engine when developing a video game that uses a newer version of the game engine. For at least the above reasons, the incorporation of the game engine can add complexity to testing of a video game.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

In certain embodiments of the present disclosure, a computer-implemented method is disclosed. This method may be implemented by an interactive computing system configured with specific computer-executable instructions. The method may include receiving a byte stream for a test session of a video game. The test session of the video game may generate a first volume of data exceeding a threshold quantity and may be associated with an execution of an instance of the video game. The method may further include decoding a portion of the byte stream into a data object. The data object may comprise data encapsulating an event associated with the execution of the instance of the video game. Further, the method may include determining that the data object corresponds to a key performance indicator and aggregating the data object with additional data objects decoded from the byte stream that correspond to the key performance indicator to obtain a set of aggregated data objects. The set of aggregated data objects may be associated with a second volume of data that is a subset of the first volume of data. The second volume of data may not exceed the threshold quantity. Moreover, the method may include evaluating the set of aggregated data objects against a trend generated from an occurrence of a plurality of additional test sessions of the video game, selecting a test procedure based at least in part on a result of said evaluating, and performing the selected test procedure automatically and without user input.

In some embodiments, decoding of the portion of the byte stream occurs as one or more additional portions of the byte stream are being received. Further, decoding the portion of the byte stream into the data object may comprise decoding the portion of the byte stream into a human-readable format. In addition, evaluating the set of aggregated data may further comprise determining, based at least in part on the set of aggregated data objects, a value corresponding to the key performance indicator, the value comprising a statistical value generated from the set of aggregated data objects, and comparing the value to the trend. Moreover, the test procedure may comprise modifying code corresponding to the video game and initiating a second test session of the video game using the modified code of the video game. In some embodiments, the test procedure may comprise modifying data supplied to the video game during execution of the video game and initiating a second test session of the video game using the modified data. Selecting the test procedure may comprise evaluating the set of aggregated data objects with a parameter function generated based at least in part on a machine learning algorithm. Further, the event may comprise a utilization of at least a portion of a computing resource in response to one or more operations performed by the video game during execution of the test session of the video game. The key performance indicator may comprise a metric associated with utilization of a computing resource during the execution of the instance of the video game. The data object and the additional data objects may correspond to utilization of a particular computing resource during the execution of the instance of the video game. In some embodiments, the method may further include aggregating the set of aggregated data objects with data objects generated from additional test sessions of the video game to obtain multi-session aggregated data and selecting the test procedure based at least in part on the multi-session aggregated data.

Certain embodiments of the present disclosure relate to a system. The system may include an electronic data store configured to store data objects corresponding to key performance indicator data and an interactive computing system comprising one or more hardware processors. The interactive computing system may be configured to execute specific computer-executable instructions to at least receive a byte stream for a test session of a video game. The test session of the video game may be associated with an execution of an instance of the video game. Further, the system may decode a portion of the byte stream into a data object. The data object may comprise data encapsulating an event associated with the execution of the instance of the video game. Further, the system may determine that the data object corresponds to a key performance indicator. In addition, the system may store the data object at the electronic data store, aggregate the data object with additional data objects stored at the electronic data store that correspond to the key performance indicator to obtain a set of aggregated data objects, generate a user interface element based at least in part on the set of aggregated data objects, and output the user interface element for display to a user.

In certain embodiments, the interactive computing system is further configured to evaluate the set of aggregated data objects against a trend generated from an occurrence of a plurality of additional test sessions of the video game, select a test procedure based at least in part on a result of said evaluating, and perform the selected test procedure. In addition, the interactive computing system may be further configured to evaluate the set of aggregated data objects by at least determining, based at least in part on the set of aggregated data objects, a statistical value corresponding to the key performance indicator, and determining whether the statistical value satisfies the trend. Further, the interactive computing system may be further configured to perform the selected test procedure by at least obtaining a modified test environment by modifying code corresponding to the video game, modifying data accessed by the video game, or modifying computing resources available to the video game, and initiating a second test session of the video game using the modified test environment. In some embodiments, the interactive computing system is further configured to select the test procedure by at least evaluating the set of aggregated data objects with a parameter function generated based at least in part on a machine learning algorithm. The event may correspond to generation of a frame of video output by the video game. Further, the key performance indicator may comprise a metric associated with performance of the instance of the video game with respect to computing resources available to the instance of the video game.

Certain embodiments of the present disclosure relate to a non-transitory computer-readable storage medium storing computer executable instructions that, when executed by one or more computing devices, configure the one or more computing devices to perform particular operations. These operations may include receiving a byte stream for a test session of a video game. The test session of the video game may be associated with an execution of an instance of the video game. Further, the operations may include decoding a portion of the byte stream into a data object. The data object may comprise data encapsulating an event associated with the execution of the instance of the video game. Decoding the portion of the byte stream into the data object may transform data from a machine-readable format to a human-readable format. Moreover, the operations may include determining that the data object corresponds to a key performance indicator, aggregating the data object with additional data objects that correspond to the key performance indicator to obtain a set of aggregated data objects, and outputting the set of aggregated data objects as a performance metric corresponding to performance of the test session of the video game.

In some embodiments, the operations may further include evaluating the set of aggregated data objects against a trend generated from an occurrence of a plurality of additional test sessions of the video game. In addition, the operations may include selecting a modified test procedure based at least in part on a result of said evaluating and performing the modified selected test procedure.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1:
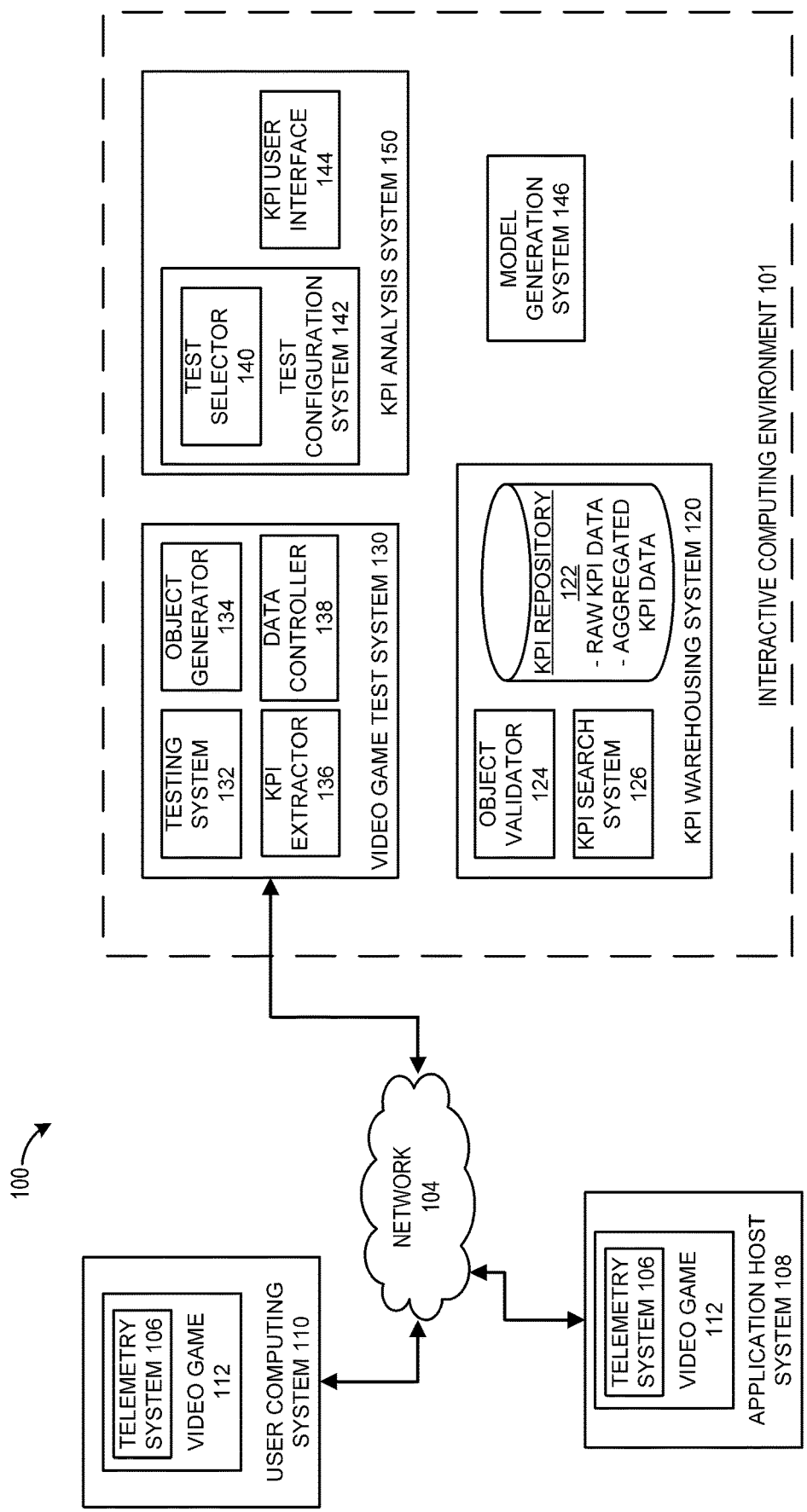
FIG. 1 illustrates an embodiment of a networked computing environment that can implement one or more embodiments of the video game test system and a key performance indicator analysis system.

Testing large applications, such as modern video games can be complex and time-consuming. Further, determining why a video game may not be executing efficiently can be challenging. In some cases, it can be challenging to identify that a video game is not executing efficiently. For example, if the video game is executing without error, it may be difficult or impossible to determine that the video game is not executing efficiently. A video game may not be executing efficiently if it uses more computing resources to execute than may be necessary to achieve similar or the same results. It can be particularly difficult to realize that a video game is not running efficiently when the computing resources, such as RAM, available to execute the video game exceed the computing resources utilized by the video game during its execution. However, as different users may have different computing resources available or as some users may desire to execute a greater number of applications at least partially in parallel, it is desirable to optimize the code of a video game to execute as efficiently as possible, or at least within a particular target efficiency.

One way to determine whether a video game is executing efficiently or has been programmed to execute efficiently is to compare execution of the video game across multiple sessions. For example, during testing of the video game, multiple iterations of the code of the video game can be compared to determine whether the video game is running efficiently, or whether the efficiency of the video game has increased or decreased as the code of the video game is changed during development. Comparing iterations of the code of the video game may include comparing performance indicators, such a RAM or CPU cycles utilized, during execution of the iterations of the code of the video game. In some cases, the performance of different video games that utilize the same game engine can be compared to determine whether a particular video game is efficiently utilizing the game engine.

The execution of an instance of a video game can be referred to as a "video game session" or a "session." It can be challenging, and in some cases impossible, to compare multiple sessions of a video game, or sessions of different video games because the amount of data produced during one session can be very large. Typically, the test data may include all of the state information of the video game and all of the measured performance data for the host system at each state of the video game. This test data can often be larger than the video game itself. For example, one ten minute session can produce 60 gigabytes or more of test data relating to the execution of the video game and its performance. Thus, both storing the performance data generated during multiple sessions of a video game and comparing the performance data across multiple sessions can be impracticable if not impossible. This problem is exacerbated with test sessions that are even longer than ten minutes and thus, produce even more test data.

Embodiments disclosed herein present a method and system that is capable of processing test data across multiple sessions of a video game. The methods and system herein can analyze a byte stream of test data as the test data is being generated. Further, data objects associated with key performance indicators can be extracted enabling a significant reduction in the size of the data to be processed. For example, in some cases it is possible to reduce 60 GBs of test data to 11 MBs. The extracted performance data can be aggregated and stored across multiple sessions of the video game enabling generation of a performance trend. Further, performance data for a particular test session can be compared with the performance trend to facilitate evaluating the code corresponding to the particular test session.

Advantageously, by processing the test data across multiple sessions of the video game, it is possible to determine performance trends for the video game and to determine whether a particular build of the code for the video game satisfies the trend. Further, embodiments disclosed herein can compare test data for sessions of different video games that share a game engine to determine whether a particular video game is utilizing the game engine as efficiently as other video games built or developed using the same game engine.

In certain embodiments, an automated testing process can be performed. Based at least in part on the evaluation of the performance data, a test system can modify code associated with the video game or a test environment of the video game. A test session can be initiated using the modified code or test environment to obtain performance data. This performance data can be compared to prior performance data or to trend data. The result of the comparison can be used to repeat the automated process enabling automated and efficient testing of the video game code. This automated testing process in some cases enables more efficient testing than a manual testing process. Further, in some cases, machine learning algorithms may be used to facilitate performance of the automated testing process. Using parameter functions developed using a machine learning process, the selection of tests to run and modifications to the testing environment can be automated.

To simplify discussion, the present disclosure is primarily described with respect to a video game. However, the present disclosure is not limited as such and may be applied to other types of applications. For example, embodiments disclosed herein may be applied to educational applications (for example, applications that help users learn a new language) or other applications where large amounts of data may be produced during testing of the application.

Example Networked Computing Environment

FIG. 1 illustrates an embodiment of a networked computing environment 100 that can implement one or more embodiments of the video game test system and a key performance indicator analysis system. The networked computing environment 100 includes a user computing system 110 that can communicate with an interactive computing environment 101 via a network 104. Further, the networked computing environment 100 may include an application host system 108 that can communicate with the interactive computing environment 101 and the user computing system 110 via the network 104.

The user computing system 110 may include, host, or execute a video game 112. In some embodiments, the user computing system 110 hosts or executes a portion of the video game 112 in the application host system 108 hosts and/or executes another portion of the video game 112. When a user initiates execution of the video game 112 on the user computing system 110, a network connection may be established with the application host system 108 and the two portions of the video game 112 may execute in conjunction with each other. For example, the application host system 108 may host and execute a portion of the video game 112 that comprises a video game environment while the user computing system 110 may execute a portion of the video game 112 that enables a user to interact with the video game environment using, for example, a playable in game character. The video game environment may include an online or digital persistent world that may be maintained after a user of the user computing system 110 disconnects from the application host system 108. As another example, the video game may be a massively multiplayer online role-playing game (MMORPG) that includes a client portion executed by the user computing system 110 and a server portion executed by one or more application host systems 108. In some embodiments, one or more application host systems 108 may be included as part of the interactive computing environment 101.

As previously mentioned, the application host system 108 may host and/or execute at least a portion of the video game 112. Alternatively, or in addition, the application host system 108 may host or execute the entirety of the video game 112 and a user may interact with the video game 112 using the user computing system 110.

The video game 112 may include a telemetry system 106. In some embodiments, the telemetry system 106 may be included by a portion of the video game 112 at the user computing system 110, a portion of the video game 112 at the application host system 108, or at portions of the video game 112 at the user computing system 110 and at the application host system 108. The telemetry system 106 may include a system capable of recording and transmitting data relating to the execution of the video game 112. This data may include a log or identification of each operation performed by the video game 112, a point in time recordation of computing resources (for example, CPU utilization, RAM utilization, GPU utilization, the RAM utilization, and the like) accessed by the video game 112, timing information relating to the receipt or triggering of operations to be performed by the video game 112, timing information relating to the execution or completion of operations to be performed by the video game 112 (for example, the amount of time to generate or display a frame a video, the amount of time to load a user or playable character profile, and the like), state information for the video game 112, login performance information (for example, the amount of time to complete a login or to load a user's account or avatar), any other type of information that can be recorded regarding the execution of the video game 112 at the user computing system 110 and/or at the application host system 108, and any other type of metric that can be recorded or measured regarding the performance of the video game 112 at the user computing system 110 and/or at the application host system 108. Much of the above data may be obtained continuously and transmitted continuously as, for example, a byte stream as the video game 112 continues to execute. This byte stream may be transmitted via the network 104 to the interactive computing environment 101. Various systems of the interactive computing environment 101 may process, analyze, or perform various actions responsive to receipt of the byte stream as will be described below.

The interactive computing environment 101 may include a video game test system 130, a key performance indicator (KPI) warehousing system 120, a KPI analysis system 150, and a model generation system 146. Further, in certain embodiments, the interactive computing environment 101 may include the application host system 108. Moreover, in certain embodiments, the interactive computing environment 101 may include the user computing system 110. For example, the interactive computing environment 101 may include one or more user computing systems 110 for performing testing of the video game 112 during, or after, development of the video game 112.

The video game test system 130 may include any system that can receive telemetry data from a telemetry system 106. Further, the video game test system 130 may include any system that can initiate or perform one or more tests with respect to the video game 112. These tests may be performed with respect to the entirety of the video game 112, a portion of the video game 112 hosted by the user computing system 110, or a portion of the video game 112 hosted by the application host system 108. The video game test system 130 may include a testing system 132 that selects, initiates, performs tests with respect to the video game 112. Further, the video game test system 130 can include a KPI extractor 136 that can extract particular portions or pieces of data from a byte stream of telemetry data received from the telemetry system 106. In addition, the video game test system 130 may include an object generator 134 that can generate one or more data objects from portions or pieces of data extracted from the byte stream of telemetry data. The video game test system 130 may also include a data controller 138 that identifies or specifies the types of data to extract from the byte stream. Typically, the data to be extracted from the byte stream may include data that relates to one or more performance indicators that a tester of the video game 112 is interested in analyzing. In some cases, the data to be extracted from the byte stream may be data utilized by an automated testing system to determine additional or social contests to be performed. The data that is to be extracted from the byte stream may be data associated with key performance indicators, or particular types of data that can be used to determine the performance of the video game 112. For example, the key performance indicators may indicate CPU utilization, GPU utilization, RAM utilization, or VRAM utilization at a given point in time during execution of the video game 112, timing for generating or displaying a frame of video, timing for generating or outputting a portion of audio, a number of threads instantiated, a number of threads for a particular aspect of the video game, state information for different aspects of the video game, and the like.

The KPI warehousing system 120 may include any system that can store data objects associated with key performance indicators at a KPI repository 122. The KPI repository 122 may store raw KPI data corresponding to the individual data objects generated from data extracted from the byte stream. Further, the KPI repository 122 may store aggregated KPI data generated based on an aggregation of a plurality of KPI data objects. In addition, the KPI warehousing system 120 may include an object validator 124 that can validate objects generated by the object generator 134 from a byte stream received from the telemetry system 106. In addition, the KPI warehousing system 120 can include a KPI search system 126 for searching the KPI repository 122 for a particular KPI or set of KPIs.

The KPI analysis system 150 may include any system for analyzing data or data objects associated with a KPI. The KPI analysis system 150 may include a test configuration system 142 and a KPI user interface 144. The test configuration system 142 may include any system for configuring a test to be performed on the video game 112. In some embodiments, the test configuration system 142 may configure a testing environment for testing the video game 112. The test configuration system 142 may include a test selector 140 that can select one or more tests to perform on the video game 112. The test selector 140 may select a test to perform based at least in part on a parameter function generated using one or more machine learning algorithms. The KPI user interface 144 may include any system that can output data associated with a KPI for display to a user, such as a tester.

The model generation system 146 can use one or more machine learning algorithms to generate one or more prediction models or parameter functions. One or more of these parameter functions may be used to determine an expected value or occurrence based on a set of inputs. For example, a prediction model can be used to determine a suite of tests to perform on the video game 112 based on one or more inputs to the prediction model, such as, for example, a set of tests performed and performance data for previous iterations of the video game or for one or more other video games, such as other video games that may share a game engine. In some cases, the prediction model may be termed a prediction model because, for example, the output may be or may be related to a prediction of an action or event, such as the prediction that a particular test is to be performed on the video game 112 or that a particular portion of the video game 112 is programmed incorrectly or inefficiently. A number of different types of algorithms may be used by the model generation system 146. For example, certain embodiments herein may use a logistical regression model. However, other models are possible, such as a linear regression model, a discrete choice model, or a generalized linear model.

The machine learning algorithms can be configured to adaptively develop and update the models over time based on new input received by the model generation system 146. For example, the models can be regenerated on a periodic basis as new test history is available to help keep the predictions in the model more accurate as the test processes for a video game or a game engine evolves over time. The model generation system 146 is described in more detail herein. After a model is generated, it can be provided to the test selector 140 to facilitate the selection of test suites.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The user computing system 110 may include hardware and software components for establishing communication with another computing system, such as the interactive computing system 130, over a communication network 104. For example, the user computing system 110 may be equipped with networking equipment and network software applications (for example, a web browser) that facilitate communications via a network (for example, the Internet) or an intranet. The user computing system 110 may include a number of local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIG. 8 and FIG. 9.

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet.

Example Byte Stream Flow

Figure 2:
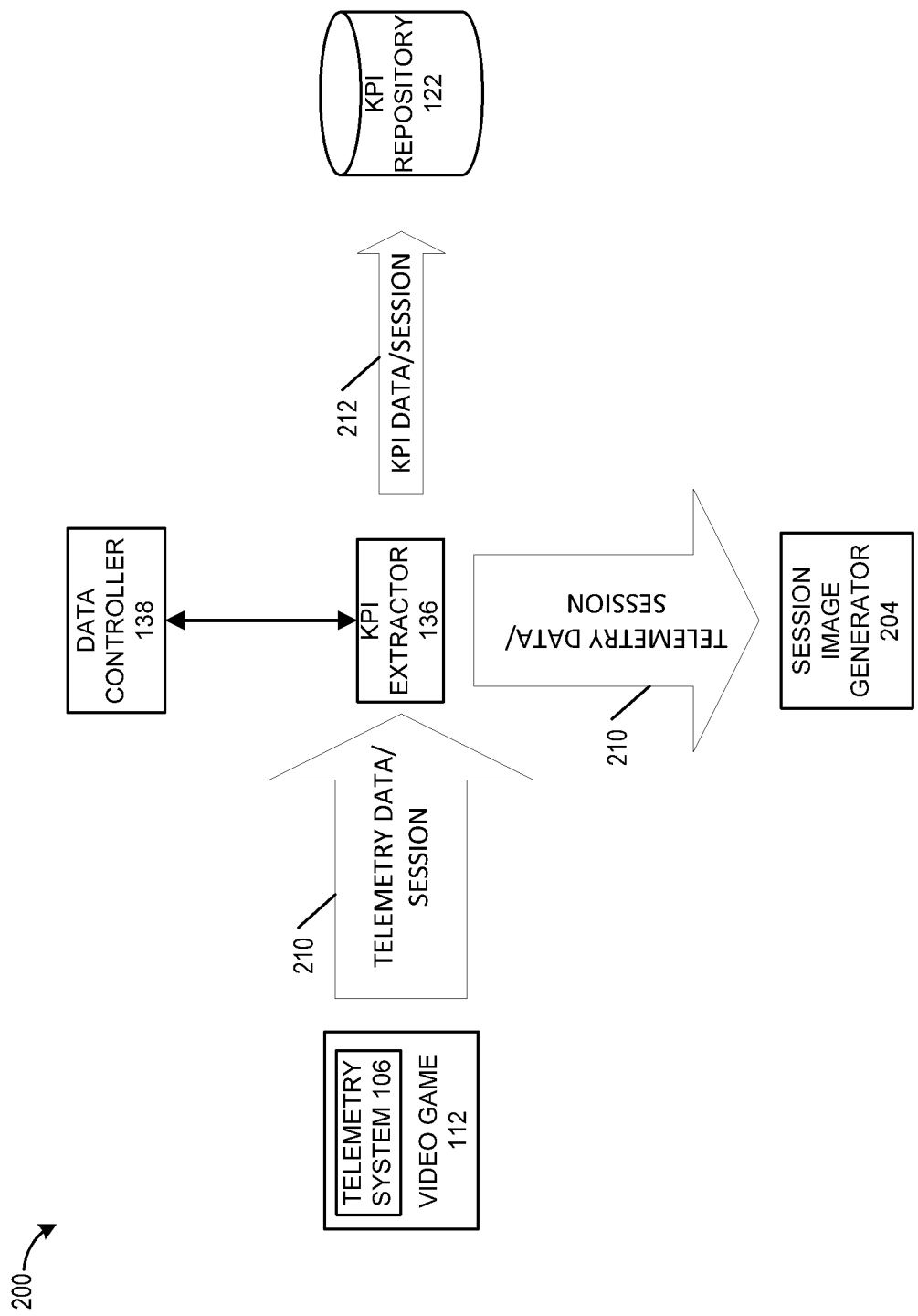
FIG. 2 illustrates an embodiment of a data flow system for the flow of data during a key performance indicator extraction and analysis process.

FIG. 2 illustrates an embodiment of a data flow system 200 for the flow of data during a key performance indicator extraction and analysis process. As previously described, the telemetry system 106 can generate and transmit a byte stream of data relating to the operation and performance of the video game 112. The amount of data that can be generated or transmitted by the telemetry system 106 for just a short period of time can be substantial. For example, for a 10 minute test session of the video game 112, the amount of data produced can be upwards of 60 GB. While some test sessions are 10 minutes or less, many test sessions are much greater than 10 minutes and thus, may produce substantially more than 60 GB of data. Accordingly, it can be difficult if not impossible to analyze and compare multiple test sessions of the video game 112 because of the large amount of data produced when testing the video game 112. For example, it may not be possible to store such large amounts of data. Further, even if the telemetry data can be stored for multiple test sessions of the video game 112, the amount of computing resources and time required to analyze and compare the telemetry data for multiple test sessions of the video game 112 may be impractical.

Embodiments disclosed herein address the aforementioned problems by scanning the telemetry data as it is created to identify one or more KPIs. The identified KPI's can then be extracted from the byte stream and stored at a KPI repository 122. By extracting the KPI's, the amount of telemetry data saved and evaluated during a test process can be reduced by several orders of magnitude. Advantageously, by reducing the amount of telemetry data, the amount of processing resources required to analyze the test session can be reduced.

The data flow system 200 illustrates the process of extracting KPI data and storing it for analysis and comparison with other test sessions. As illustrated in FIG. 2, the telemetry system 106 may produce a byte stream of telemetry data 210 for each test session. This telemetry data may be provided to a KPI extractor 136. Further, the KPI extractor 136 may receive from a data controller 138 an identification of KPI data to extract from the telemetry data 210. The KPI data to extract may be specified by a user, such as a tester or administrator, or may be specified by an automated testing system, such as the testing system 132.

As the byte stream 210 is received by the KPI extractor 136, the KPI extractor 136 can determine whether a portion of the data included in the byte stream 210 corresponds to one or more of the selected KPI. If the portion of the data does correspond to the one or more selected KPI, a portion of the data may be stored at the KPI repository 122 as illustrated by the KPI data 212, which is generated for each test session. Further, the KPI extractor 136 may forward the telemetry data 210 to a session image generator 204 which may create an image of the entire test session. This image may be created on a hard drive or solid state drive, or in a non-transitory storage medium, such as a DVD. As illustrated by the thinner arrow, the KPI data 212 forwarded to the KPI repository 122 may be substantially less than the telemetry data 210 that is obtained from the telemetry system 106. For example, while the telemetry data 210 may encompass hundreds of gigabytes of data, the KPI data 212 may only be 15 or 20 MB of data.

Example KPI Identification and Storage Process

Figure 3:
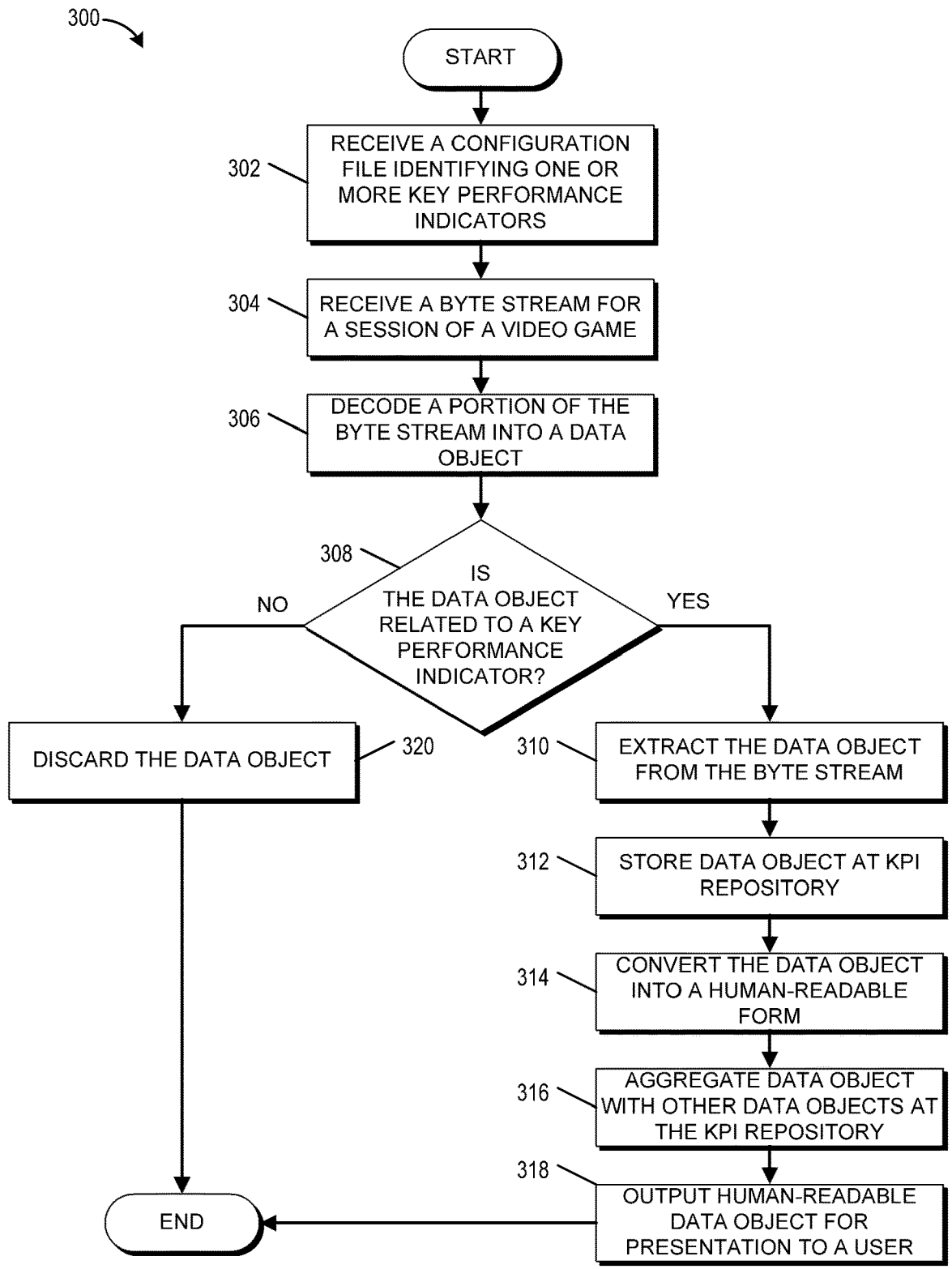
FIG. 3 presents a flowchart of an embodiment of a key performance indicator identification and storage process.

FIG. 3 presents a flowchart of an embodiment of a key performance indicator identification and storage process 300. The process 300 can be implemented by any system that can identify key performance indicators within a byte stream of telemetry data obtained from a telemetry system 106 of a video game 112. The process 300, in whole or in part, can be implemented by, for example, a telemetry system 106, a video game 112, a video game test system 130, a KPI extractor 136, a data controller 138, a KPI warehousing system 120, a KPI analysis system 150, or a KPI user interface 144, among others. Although any number of systems, in whole or in part, can implement the process 300, to simplify discussion the process 300 will be described with respect to particular systems. Further, the process 300, or particular operations of the process 300 may be performed continuously or repeatedly during a session of a video game 112.

The process 300 begins at block 302 where the KPI extractor 136 receives a configuration file identifying one or more key performance indicators. The configuration file may be received from the data controller 138 in response to an action by a user or by initiation of a test session by the testing system 132. In some embodiments, the data controller 138 specifies one or more key performance indicators for the KPI extractor 136 to identify from a byte stream with or without providing a configuration file to the KPI extractor 136. The key performance indicators identified by the data controller 138 may depend on the tests initiated by the testing system 132. For example, if a test initiated by the testing system 132 relates to the display of images or video to a user playing the video game 112, the KPIs identified by the data controller 138 may relate to utilization of graphics resources of the user computing system 110, the speed with which a frame is generated for display to a user, or the number of frames which may be generated per second. As another example, if the test initiated by the testing system 132 relates to the game flow logic of the video game 112, the KPIs identified by the data controller 138 may relate to the state of the video game 112 in response to different triggers generated by the testing system 132.

At block 304, the KPI extractor 136 receives a byte stream for a session of the video game 112. The byte stream may include binary coded data. As previously described, the byte stream may include some or all of the state information that can be generated by the video game 112 as well as performance information relating to utilization of computing resources at the user computing system 110. Further, the byte stream may include information relating to the utilization of computing resources of the application host system 108 as well as state information for a portion of the video game 112 posted by the application host system 108. As the byte stream may include all of the state information generated by the video game 112, the byte stream may be a continuous stream of data provided by the telemetry system 106 to the video game test system 130. Thus, some or all of the process 300 may be occurring repeatedly as additional bytes in the byte stream are received by the video game test system 130. In some embodiments, the byte stream received by the video game test system 130 may be a pair of byte streams received from the telemetry system 106 of the user computing system 110 in the telemetry system 106 of the application host system 108. Alternatively, the byte stream received by the video game test system 130 may be an aggregated byte stream that is aggregated from a byte stream generated by the telemetry system 106 of the user computing system 110 in the telemetry system 106 of the application host system 108.

It should be understood from the above description that a large percentage, and typically a majority, of the bytes of data included in the byte stream may be unrelated to the KPI specified in the configuration file or otherwise identified as part of the block 302. For example, the bytes of data may include state information of the video game 112 that is unrelated or tangentially related to performance, such as the outfit of an avatar or the amount of in-game coins collected by the user. Further, the byte stream may include data that does relate to the performance of the video game 112, but is unrelated to the requested KPI data. Further, as different tests or different aspects of the video game 112 may be tested during different performances of the process 300, the KPIs identified at the block 302 and the corresponding KPI data of interest in the byte stream may change during different occurrences of the process 300.

At block 306, the object generator 134 decodes a portion of the byte stream into a data object. Decoding a portion of the byte stream may include identifying markers within the byte stream that mark boundaries of information within the byte stream. Further, decoding a portion of the byte stream into the data object may include identifying multiple portions of the byte stream that relate to the same metric or information associated with execution of the video game 112. The multiple portions of the byte stream may be aggregated together in generating the data object.

In some cases, the portion of the byte stream corresponds to a particular event occurring during execution of an instance of the video game 112. Thus, the data object may correspond to the particular event. The event may relate to particular actions or occurrences within the video game 112. For example, the event may relate to the defeat of an enemy, the completion of a level, or the obtaining of an in-game item. Alternatively, or in addition, the event may relate to particular types of processing or computer resource utilization by the video game 112. For example, the event may relate to the instantiation of several instances of an object corresponding to code for the creation and/or control of several instances of an enemy. As another example, the event may relate to the reservation of a portion of RAM for the video game 112. For example, an event may be defined by or associated with the allocation, accessing, or modification of memory or RAM. In certain embodiments, one or more portions of the byte stream may be decoded at the block 306 while additional portions of the byte stream are being received as part of the operations associated with the block 304. Thus, operations associated with the blocks 304 and 306 may be performed at least partially in parallel.

In some embodiments, the data object may include one or more of event data (such as the defeat of a monster), performance related data (such as VRAM utilization), timeline information, or any other information that can be derived from a byte stream of the video game 112 under test. Thus, it is possible to examine the data object in the context of the test session, or multiple test sessions, to determine what operations occurred at a given point in time during execution of the video game 112 and the effect of the specific operations on performance of the video game 112.

At decision block 308, the KPI extractor 136 determines whether the data object is related to a key performance indicator. In some cases, the data object may relate to the performance of the video game 112, but may not relate to a KPI identified at the block 302. Determining whether the data object is related to a key performance indicator may include determining a name or tag associated with the data object or the type of data associated with the data object. Further, determining whether the data object is related to a key performance indicator may include comparing the data object, or an identifier thereof, to a set of one or more types of KPIs identified by the data controller 138. Advantageously, in certain embodiments, the decision block 308 involves performing a real time, or substantially real-time, inspection or analysis of the byte stream. By performing a real-time analysis of the byte stream, it is possible to reduce the amount of storage required for storing the telemetry data because telemetry data that is unrelated to particular metrics of interest to a tester can be omitted from storage at the KPI repository 122.

If it is determined at the decision block 308 that the data object is related to a key performance indicator, the KPI extractor 136 extracts the data object from the byte stream at block 310. Extracting the data object from the byte stream may include creating a copy of the data object. Alternatively, or in addition, extracting the data object from the byte stream may include removing the data object from the byte stream.

At block 312, the KPI warehousing system 120 stores the data object at the KPI repository 122. The data object may be stored as raw KPI data at the KPI repository 122. Alternatively, or in addition, the data object may be stored as aggregated KPI data that is aggregated with other data objects. In some embodiments, the block 312 may include validating the data object using, for example, the object allocator 124 before cueing the data for storage or aggregation, or other processing. Validating the data object they include confirming that the data object satisfies a particular format. Further, validating the data object may include confirming that no errors occurred during conversion of the byte stream to the data object. In some cases, validating the data object may include determining that the data object includes values for each aspect or variable of the data object. For example, suppose that one KPI interest relates to the timing of video frames. The identification of a portion of the byte stream relating to an initial request to generate the frame of the video may cause generation of a data object. However, if the data object does not include the completion time for the frame, the data object may not be successfully validated by the object validator 124. In some embodiments, the block 312 may also include providing the data object to the session image generator for storage with the rest of the byte stream that was not associated with a key performance indicator.

The total amount of storage for storing the data objects identified as relating to the key performance indicators is usually substantially less than the size of the byte stream. Typically, the amount of storage space for storing the data objects identified as related to the key performance indicators is one or more orders of magnitude less than the size of the byte stream. Advantageously, in certain embodiments, extracting key performance indicators or data corresponding to key performance indicators from the byte stream, it is possible to store data for multiple test sessions and compare the data across test sessions. Often, it is not possible to store the entire byte stream due to its size. Further, due to the size of the byte stream, it is often not possible to compare data across multiple test sessions of the video game 112 because, for example, it is not possible to store data from multiple byte streams or to process multiple byte streams in parallel due to the amount of data produced by each test session of the video game 112. However, extracting the data correspond to the identify key performance indicators, it is possible to develop the trend for multiple test sessions and to compare the KPI data across multiple test sessions and/or to the calculated trend.

At block 314, the object generator 134 converts the data object into a human readable form. Converting the data object into a human readable form may include converting the data object to a particular file format that uses human readable text. For example, the data object may be converted to an eXtensible Markup Language (XML) format or a JavaScript Object Notation (JSON) format. In some embodiments, the data object created at block 306 is in human-readable form. In such embodiments, the block 314 may be redundant and may be omitted.

At block 316, the KPI warehousing system 120 aggregates the data object with other data objects at the KPI repository 122. Aggregating the data object with other data objects may occur as the data object is obtained or generated from the byte stream. Alternatively, or in addition, data objects stored at the KPI repository 122 may be aggregated after processing of the byte stream is completed. Aggregating the data object may include performing a statistical process on a set of related data objects. For example, aggregating the data objects may include averaging the data objects over a particular time period. For example, a set of data objects may be averaged to determine an average amount of time for rendering one or more frames over different time periods. As another example, a set of data objects may be averaged to determine an average utilization of one or more types of computing resources over different periods of time.

Generally, the data objects aggregated at the block 316 are obtained from the same byte stream associated with the same session or instance of the video game 112 under test. However, in some embodiments, data objects may be aggregated across instances of the video game 112. For example, data objects for test sessions conducted on a particular version of the video game 112 or during a particular day may be aggregated together.

In some cases, a data object or an aggregated set of data objects may be associated with or linked to particular states of the video game. Advantageously, in certain embodiments, by associating or linking a data object or an aggregated set of data objects with a particular state of the video game, it can be determined how different states of the video game may impact different metrics, such as computer resource utilization, over time. For example, by linking the aggregated set of data objects with a particular state of the video game, it can be determined how increasing the number of characters within the display can affect frame rendering or computer resource utilization for a particular video game.

At block 318, the KPI user interface 144 outputs the human readable data objects for presentation to a user. The human readable data objects may be output individually for display. Alternatively, or in addition, an aggregated set of the human readable data objects may be output for display. Outputting one or more data objects for display may include generating one or more different types of user interfaces to present the data associated with the one or more data objects to a user. For example, a graph may be generated based on the data objects to illustrate changing computer resource consumption over time. In some embodiments, the user interface may present data objects associated with the execution of the video game 112 is correlated with particular states of the video game 112. For example, frame processing time versus dynamic objects within the video game environment may be displayed on a graph over time as the number of dynamic objects within the video game environment changes. As another example, a plurality of data objects corresponding to a number of instantiated threads for different aspects of the video game at a given point in time may be displayed to a user via a chart or graph. Further, by aggregating the data objects, the total number of instantiated threads a given point time for a video game 112 can be determined and displayed to the user.

In some embodiments, a user can view the KPI data as it is being generated or stored. Thus, for example, if a user has a suspicion that a particular aspect of the video game 112 is causing performance issues, the user can monitor the KPI data as a test session of the video game 112 is occurring to determine whether the user's suspicion is correct. Moreover, a user can determine whether performance of a video game 112 is getting better or worse within a particular session of the video game. By monitoring the performance of the video game while it is under test, performance issues can be detected sooner than waiting for a test session to complete. For example, if performance of the video game is steadily decreasing during a test session, it may be determined that there is a memory leak. Waiting for a test session to complete may not be a problem for a short test (e.g., 30 seconds), but for longer test sessions (e.g., an hour or more), waiting for the test to complete to identify a performance issue that may be detectable within, for example, the first five minutes can waste a lot of test time and computing resources.

If it is determined at the decision block 308 that the data object is not related to a key performance indicator, the KPI extractor 136 discards the data object. Advantageously, in certain embodiments, by storing data objects relating to the KPI and discarding other data objects, the amount of data storage required to save session information may be reduced drastically. For example, a 20 minute test session that may produce 120 GB of data may be reduced to 22 MBs. By reducing the storage used to store KPI data for a session, it is possible to store KPI data for more sessions. Further, it is possible to analyze KPI data across multiple sessions. In some embodiments, instead of discarding the data object at the block 320, the block 320 involves forwarding the data object to a session image generator, such as the session image generator 204. In some embodiments, the data object is forwarded to the session image generator 204 regardless of whether the data object is related to a key performance indicator. The session image generator 204 may store the data object as part of an image of the test session. This image of the test session may be stored at a secondary storage, network storage, or on a non-transitory computer readable medium, such as a DVD or flash drive. Although typically the amount of storage needed to store data objects corresponding to the entire byte stream makes storing the entire byte stream impossible or impracticable, in some cases, where the test session is relatively short or produces a relatively small amount of data, it may be possible to store the entire byte stream (for example, a test session that produces 1 GB of data). When creating an image based on the entire byte stream, analyzing data across multiple test sessions may in some cases still be challenging due to the amount of processing resources and time required to analyze multiple test sessions.

Portions of the process 300 may be repeated with additional portions of the byte stream. In some embodiments, the process 300 may include determining whether receipt of the byte stream is complete. If portions of the byte stream are still being received to, the process 300 may return to the block 306. However, if it is determined that portions of the byte stream are no longer being received, the process 300 may end.

Example Automated Testing Process

Figure 4:
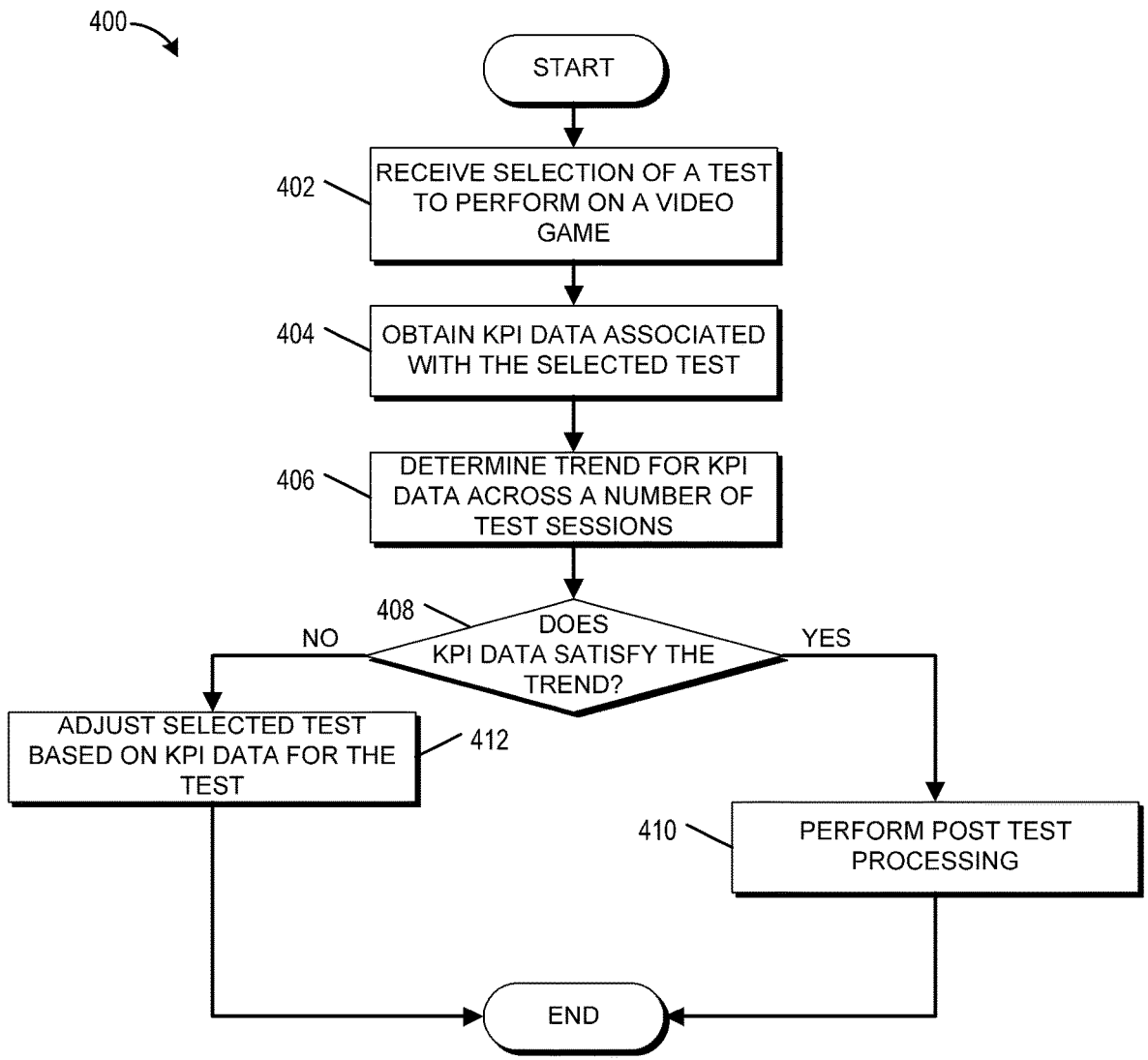
FIG. 4 presents a flowchart of an embodiment of a process for performing automated testing using key performance indicator information.

FIG. 4 presents a flowchart of an embodiment of a process 400 for performing automated testing using key performance indicator information. The process 400 can be implemented by any system that can test a video game to determine key performance information. In some embodiments, one or more tests of the video game may be determined based on KPI information obtained from prior tests enabling automated testing of the video game. The process 400, in whole or in part, can be implemented by, for example, a telemetry system 106, a video game 112, a video game test system 130, a testing system 132, a KPI extractor 136, a data controller 138, a KPI warehousing system 120, a KPI analysis system 150, a test configuration system 142, a test selector 140, a model generation system 146, or a KPI user interface 144, among others. Although any number of systems, in whole or in part, can implement the process 400, to simplify discussion the process 400 will be described with respect to particular systems. Further, the process 400, or particular operations of the process 400 may be performed continuously or repeatedly for a video game 112 until a condition is reached or a user stops the process 400. For example, the process 400 may be configured to repeat a particular number of times, until a result of the testing satisfies a condition, it is determined that a result of the testing is unlikely to satisfy the condition, or it cannot be determined which test to perform. In some embodiments, the process 400 can be performed as part of a nightly build or at some other predetermined or identified time.

The process 400 begins at block 402 where the testing system 132 receives a selection of a test to perform in a video game 112. The selection of the test to perform may be received from a user, such as a tester. Alternatively, or in addition, the selection of the test to perform may be selected using an automated process and/or using one or more machine learning algorithms. For example, the test selector 140 may automatically select a test to perform based on a result of applying KPI data to a parameter function generated using a machine learning process. Further, the test configuration system 142 may configure the video game 112 or a testing environment for the video game 112 to facilitate performance of the test selected by the test selector 140.

At block 404, the KPI analysis system 150 obtains KPI data associated with the test selected at the block 402. In some cases, the KPI analysis system 150 may obtain the KPI data using one or more embodiments of the process 300 previously described with respect to FIG. 3. Alternatively, or in addition, the KPI analysis system 150 may obtain the KPI data by accessing the KPI repository 122 at the KPI warehousing system 120. In some cases, the KPI analysis system 150 may use the KPI search system 126 to search for and/or obtain KPI data associated with the video game, or a particular build of code corresponding to the video game 112, from the KPI repository 122. In some cases, at least some of the KPI data is associated with a game engine used by the video game 112. The KPI data for the game engine may be used to help select a test to perform on the video game 112.

At block 406, the KPI analysis system 150 determines a trend for a particular KPI across a number of test sessions. In some cases, the block 406 may be performed for multiple KPI. Determining a trend for the KPI may include comparing KPI data corresponding to the particular KPI across the number of test sessions. Further, determining the trend for the KPI data may include performing one or more statistical processes on the KPI data. For example, determining a trend for the KPI data may include averaging KPI data for one or more test sessions and comparing subsequent test sessions to the averaged KPI data. The trend for the KPI data may be determined for any number of test sessions. For example, the trend may be determined for two, five, ten, or twenty test sessions.

Further, in some embodiments, at least some of the test sessions may correspond to different iterations of the video game 112. For example, over time, the code for the video game 112 may change as testing identifies bugs in the code or features that can be added or improved. Moreover, over time, efficiency improvements may be made to the code of the video game 112. Thus, the KPI data obtained at the block 404 may correspond to different versions of the code of the video game 112 in the trend for the KPI data may reflect changes in the code of the video game 112. Moreover, in certain embodiments, the code for the video game 112 may be the same across test sessions, but data provided to the video game 112 or commands performed with respect to the video game 112 may differ across test sessions as different aspects of the video game 112 are tested. Further, in some embodiments, the test sessions may be for different video games that share the same game engine.

In some embodiments, a trend may be determined for KPI data within a single test session. For example, a trend for memory utilization may be determined during a test session. Advantageously, in certain embodiments, by determining a performance trend within a single test session, it can be determined if a particular portion of the video game does not satisfy the trend, which may indicate a coding error or may indicate that system requirements for the video game may need to change. For example, if a particular level within the video game 112 utilizes more than a baseline amount of memory, it may be determined that the video game 112 requires a greater than expected amount of memory to execute. However, if it is determined from KPI data that the amount of data objects created for the level satisfies a trend, then the increased memory utilization may instead indicate a memory leak in the code corresponding to the level.

It is possible in some embodiments to aggregate data across different systems that are testing the video game 112. For example, tests performed on a first set of systems that include a particular video card model may be aggregated separately from tests performed on a second set of systems that include another video card model. Advantageously, in certain embodiments, a baseline performance can be established for each of the video card models enabling testing to determine whether both brands of video cards perform equally or perform to a minimum desired level of performance.

At decision block 408, the KPI analysis system 150 determines whether the KPI data obtained at the block 404 satisfies the trend determined at the block 406. Determining whether the KPI data obtained at the block 404 satisfies the trend may include determining whether the KPI data or aggregated KPI data is within a threshold of the trend. For example, an average, or other statistical value, for a set of KPI data may be calculated and this average may be compared to a trend to determine whether the average is within a threshold of the trend.

In some embodiments, the threshold may be with respect to a particular phase. For example, if the KPI data relates to the number of frames per second that are generated over time by the video game 112, the threshold may correspond to a reduction in the number of frames per second compared to the trend. Thus, if the reduction in the number of frames per second exceeds the threshold, the KPI analysis system 150 would determine that the KPI data does not satisfy the trend. However, KPI data indicating any increase, or less than a threshold decrease, in the number of frames per second generated by the video game 112 to be considered to satisfy the trend by the KPI analysis system 150.

Different trends may be established for different time periods. Alternatively, or in addition, the trend may identify performance of an aspect of the video game 112 over time. For example, KPI data relating to login time for the test sessions of each day may be aggregated to determine a trend for login time over a number of days. KPI data for test sessions of a particular day can be compared to the trend to determine whether login time is becoming faster, staying the same, or becoming slower across a number of days.

If it is determined at the decision block 408 that the KPI data does satisfy the trend, the KPI analysis system 150 performs post test processing at the block 410. The post test processing may include storing the KPI data or an indication that the KPI data satisfies the trend at a log. This log may be stored at a repository, such as the KPI repository 122. Further, in some embodiments, the post test processing may include updating the trend for the KPI. Moreover, the posttest processing may include outputting a result of the test, identifying the builder code associated with the video game 112 as verified, uploading or otherwise marking the code associated with the video game 112 as a stable build, or any other process that may be performed for a successful test of the video game 112. In some embodiments, the process 400 may end after completing operations associated with the block 410. However, in other embodiments, the process 400 may instead proceed to the block 412 to perform additional testing. This additional testing may be initiated by user or may be performed automatically based on, for example, the particular KPI data obtained at the block 404.

If it is determined at the decision block 408 that the KPI data does not satisfy the trend, the test configuration system 142 adjusts the selected test based at least in part on the KPI data obtained at the block 404 for the previously performed test at block 412. Adjusting the selected test may include using the test selector 140 to select a new test to perform on the video game 112. Alternatively, or in addition, adjusting the selected test may include adjusting code corresponding to the video game 112, adjusting data provided or commands performed with respect to the video game 112, or adjusting a testing environment within which the video game 112 executes. In some embodiments, adjusting the selected test may include providing the KPI data to a parameter or prediction function generated by the model generation system 146 to identify a test to perform on the video game 112.

In some embodiments, a test may fail. In such cases, the failed test may be treated similarly as when the KPI data does not satisfy a trend or baseline value. Further, a user may be alerted that the test failed. Alternatively, or in addition, further testing may automatically be performed by the testing system 132, which can perform tests selected by the test selector 140 using a parameter function generated by the model generation system 146.

Advantageously, in certain embodiments, by using the parameter function generated by the model generation system 146, testing the video game 112 can be automated. For example, the process 400 may be performed with a particular test of the video game 112. KPI data generated from the initial test can be supplied to a parameter function to identify further tests to be performed with respect to the video game 112. KPI data selected from these further tests can be supplied to additional parameter functions to identify further tests to perform with respect to the video game 112. This process may repeat for a number of iterations or until a particular condition is satisfied. This condition may relate to whether the KPI data satisfies the trend, whether a difference between the KPI data in the trend satisfies or does not satisfy a threshold, a particular number of tests has been completed.

In some embodiments, the test selector 140 may automatically select new tests to perform based on KPI data applied to a parameter function regardless of whether the KPI data satisfies a trend. Further, the parameter function may use the KPI data to predict subsequent tests that should be performed to establish that performance of a video game satisfies a set of performance or operation criteria, such as executing without crashing or executing with respect to a set of desired minimal system or resource requirements.

Advantageously, in certain embodiments, by comparing the KPI data to a trend that is generated over a plurality of test sessions, it is possible to determine whether the code corresponding to a video game 112 is improving. The code corresponding to the video game 112 may change over time due to further development to add new features or to try and improve efficiency. Further, the code may change as bugs or coding errors are corrected. Moreover, in some cases, developers may decide to change from one version of a game engine to another version, such as when a newer version of the game engine is released during development of the video game. All of the aforementioned code changes may affect code performance negatively or positively. By establishing a baseline for a particular KPI, and comparing KPI data of a number of test sessions to the baseline, it is possible to determine whether development of code corresponding to the video game 112 is resulting in performance improvements or whether new features are not causing performance degradation.

Moreover, as previously mentioned, the trend may change over time. Thus, as the code is changed, the baseline for a KPI that KPI test data is compared against may change. In some cases, a user may accept a worse baseline because, for example, new features decrease performance by an acceptable amount as determined by a developer or tester. In other cases, the baseline may improve due to performance improvements in the code.

In certain embodiments, because some video games share a game engine, it is possible to use the process 400 to determine whether multiple video games are using the game engine to the same level of efficiency. For example, if two video games are using the same rendering system included in a game engine, but the performance is vastly different, it may be determined that one of the video games is not efficiently using the game engine.

Example Model Generation System

Figure 5:
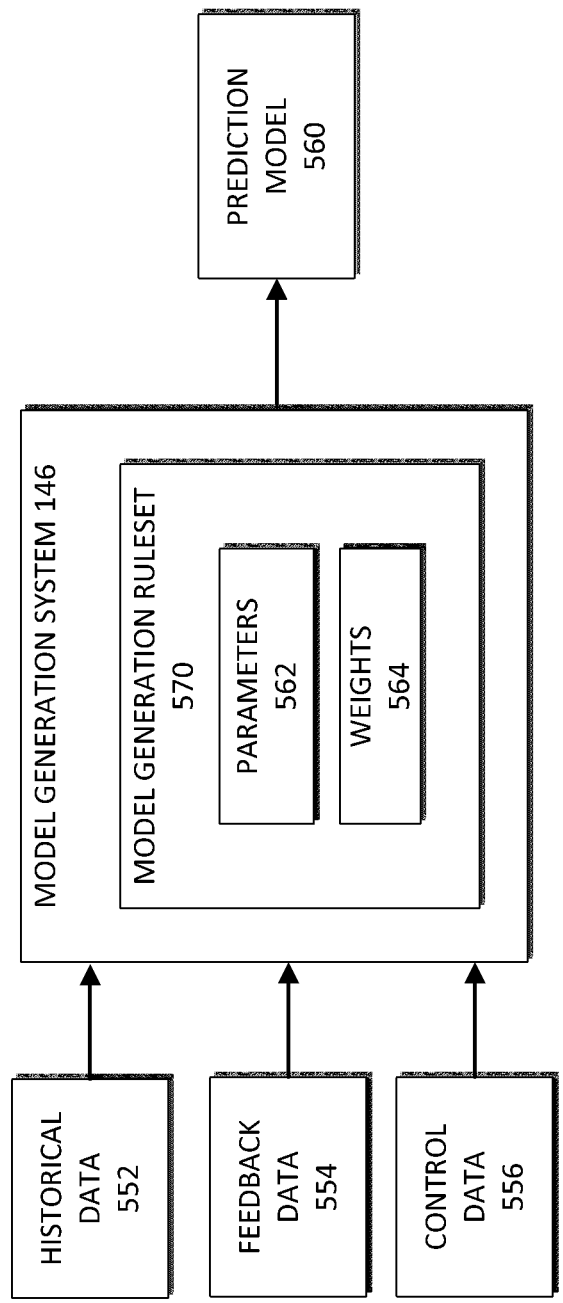
FIG. 5 illustrates an embodiment of a model generation system of FIG. 1.

FIG. 5 illustrates an embodiment of a model generation system 146 of FIG. 1. The model generation system 146 may be used to determine one or more prediction models 560 based on historical data 552 for a number of different KPI. Typically, although not necessarily, the historical data 552 includes a large amount of data associated with the KPI. For example the historical data 552 may include KPI data for hundreds, or more, iterations of a test session for a video game or game engine. Further, the historical data 552 can include data received from one or more data sources, such as, for example, one or more video games that share a game engine. In some embodiments, the historical data 552 may include a very large number of data points, such as millions of data points, which may be aggregated into one or more data sets. In some cases, the historical data 552 may be accessed from a KPI repository 122. Further, in some embodiments, one or more subsets of the historical data are limited by a date restriction, such as for example, limited to include only data from the last 6 months. The historical data may also be restricted to a particular number of previous builds of a video game or game engine.

The historical data 552 may include an identification of tests performed in response to different KPI data. Further, the historical data 552 may include changes to data supplied to a video game, operations performed with respect to a video game, and changes to a test environment for a video game associated to different KPI data.

The model generation system 146 may, in some cases, also receive feedback data 554. This data may be received as part of a supervised model generation process that enables a user, such as an administrator, to provide additional input to the model generation system 146 that may be used to facilitate generation of the prediction model 560. For example, if an anomaly exists in the historical data 552, the user may tag the anomalous data enabling the model generation system 146 to handle the tagged data differently, such as applying a different weight to the data or excluding the data from the model generation process.

Further, the model generation system 146 may receive control data 556. This control data 556 may identify one or more features or characteristics for which the model generation system 146 is to determine a model. Further, in some cases, the control data 556 may indicate a value for the one or more features identified in the control data 556. For example, suppose the control data 556 indicates that a prediction model is to be generated using the historical data 552 to select a test of frame rendering rate. If the frame render rate for a number of videos within a video game is know, this data may be provided as part of the control data 556, or as part of the historical data 552.

The model generation system 146 may generally include a model generation rule set 570 for generation of the prediction model 560. The rule set 570 may include one or more parameters 562. Each set of parameters 562 may be combined using one or more mathematical functions to obtain a parameter function. Further, one or more specific parameters may be weighted by the weights 564. In some cases, the parameter function may be obtained by combining a set of parameters with a respective set of weights 564. The prediction model 560 and/or the respective parameters 562 of the prediction models 560 may be derived during a training process based on particular input data, such as the historical data 552, feedback data 554, and control data 556, and defined output criteria, which may be included with the control data 556, used for training purposes. The model generation rule set 570 can define the specific machine learning rules and/or algorithms the model generation system 146 uses to generate the model based on a defined objective function, such as determining a test to perform or a test environment in which to test a video game. The test environment may refer to the computing resources available to the video game 112 or a state of the video game when initiating the test of the video game 112.

In some embodiments, initial parameters 562 and weights 564 can be manually provided during the initiation of the model generation process. The parameters 562 and weights 564 can be updated and modified during the model generation phase to generate the prediction model 560. In some embodiments, weights may be applied to the parameter functions or prediction models themselves. For example, the mathematical complexity or the number of parameters included in a particular prediction model 560 may affect a weight for the particular prediction model 560, which may impact the generation of the model and/or a selection algorithm or a selection probability that the particular prediction model 560 is selected.

The model generation system 146 can filter and categorize the historical data sets according to various characteristics and parameters of the data. For example, the data can be categorized by the data source (such as, for example, companion application interaction data, game application data, host application data, or user profile data), information type (such as, for example, utterance commands, utterance statements, utterance queries, gameplay information, transaction information, interaction information, or game account information), opponent data (such as, for example, skill of opponent, role selected or played by opponent, or success rate verse opponent), teammate data (such as, for example, skill of teammates, roles selected or played by teammates, or success rate when playing with a particular teammate) or other categories associated with the data. The model generation system 146 can filter the information to identify the information for further processing. In some embodiments, the model generation system 146 is configured to filter and separate the historical data 552 into a plurality of data types or categories before further processing. Moreover, in some cases, some of the historical data 552 may be filtered out or removed from the historical data 552 based on the data being associated with a relevance that does not satisfy a threshold relevance as determined by the model generation system 146.

After the prediction model 560 has been generated, the model can be used during runtime of the test selector 140 to select a test to perform on the video game 112. Further, the prediction model 560 may be used to modify the video game 112, to modify a state of the video game 112, to modify data provided to the video game 112, and/or to modify a test environment for the video game 112.

Example Test Selector

Figure 6:
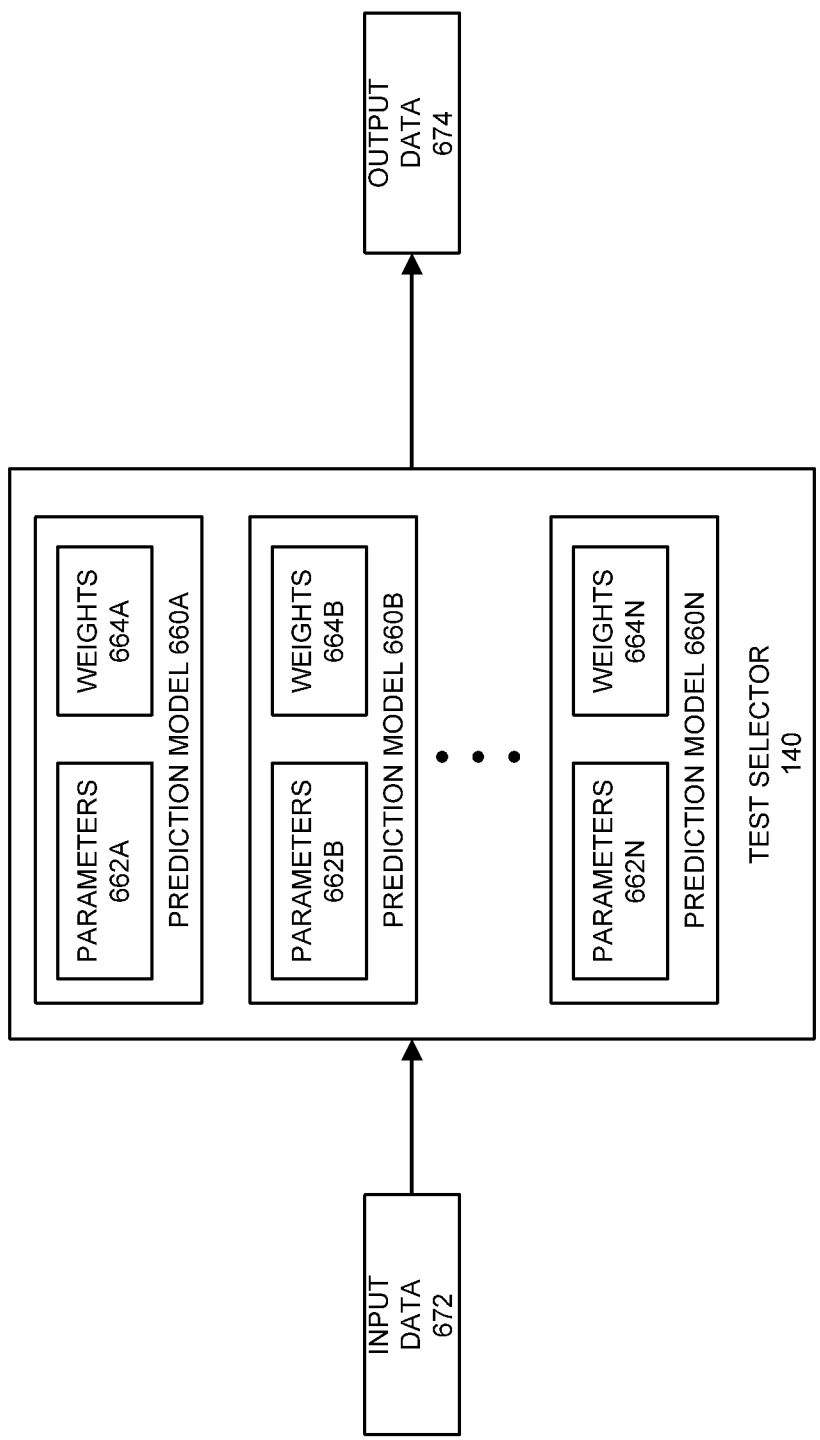
FIG. 6 illustrates an embodiment of a test selector of FIG. 1.

FIG. 6 illustrates an embodiment of a test selector 140 of FIG. 1. The test selector 140 can apply or use one or more of the prediction models 660 generated by the model generation system 146. Although illustrated as a separate system, in some cases, the features of the test selector 140 are performed by the test configuration system 142, the testing system 132, or the video game test system 130. The test selector 140 may use one or more prediction models 660A, 660B, 660N (which may be referred to collectively as "prediction models 660" or in the singular as "prediction model 660") to process the input data 672 to obtain the output data 674.

The test selector 140 may apply the prediction model(s) 660 during determination of a test to perform on a video game 112 in response to obtaining KPI data from the video game or from a game engine used by the video game 112. In some cases, the prediction models 660 are applied after a trigger occurs. For example, the prediction models 160 may be used to select a test after determining that KPI data does not satisfy a trend for the KPI or is not within a threshold of the trend. The input data 672 can include one or more pieces of data associated with the video game 112 or that may be used to facilitate test selection, such as an expected number of simultaneous players, a target minimum hardware requirements, or a game engine used in development of the video game 112.

In some embodiments, a single prediction model 660 may exist for the test selector 140. However, as illustrated, it is possible for the test selector 140 to include multiple prediction models 660. The test selector 140 can determine which prediction model, such as any of models 660A-N, to use based on input data 672 and/or additional identifiers associated with the input data 672. Additionally, the prediction model 660 selected may be selected based on the specific data provided as input data 672. The availability of particular types of data as part of the input data 672 can affect the selection of the prediction model 660. For example, the identification of a particular game engine as part of the input data may result in the use of prediction model 660A. However, if a game engine was not used, or if a new game engine not previously used in previous video games is used, then prediction model 660B may be used instead.

The output data 674 can be a test selection. Alternatively, or in addition, the output data 674 can be an identification of a test environment or a particular KPI to measure or test. In some cases, the output data 674 is a value corresponding to a particular test to perform. For example, if the output if value '1', then test one should be performed or a particular KPI should be evaluated.

The prediction models 660A, 660B, 660N may generally include a set of one or more parameters 662A, 662B, 662N, respectively (which may be referred to collectively as "parameters 662"). Each set of parameters 662 (such as parameters 662A) may be combined using one or more mathematical functions to obtain a parameter function. Further, one or more specific parameters from the parameters 662A, 662B, 662N may be weighted by the weights 664A, 664B, 664N (which may be referred to collectively as "weights 664"). In some cases, the parameter function may be obtained by combining a set of parameters (such as the parameters 662A) with a respective set of weights 664 (such as the weights 664A).

Example Prediction Model Generation Process

Figure 7:
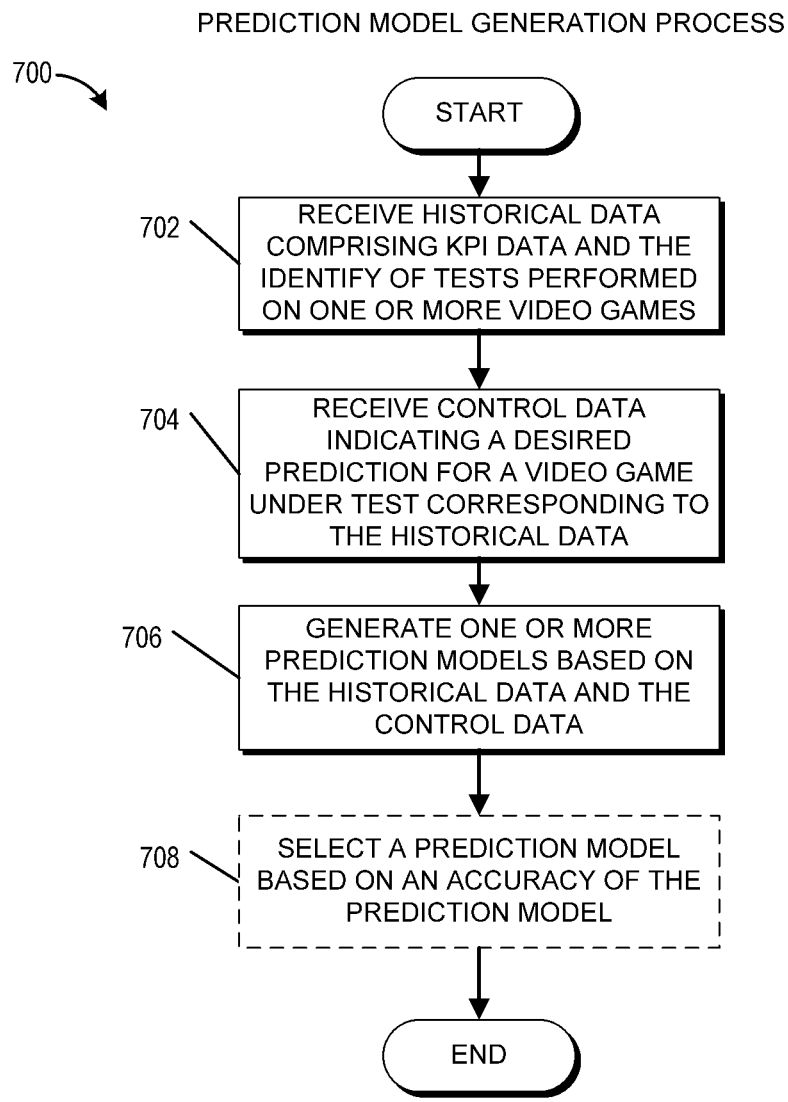
FIG. 7 presents a flowchart of an embodiment of a prediction model generation process.

FIG. 7 presents a flowchart of an embodiment of a prediction model generation process. The process 700 can be implemented by any system that can generate one or more parameter functions or prediction models that include one or more parameters. In some cases, the process 700 serves as a training process for developing one or more parameter functions or prediction models based on historical data or other known data. The process 700, in whole or in part, can be implemented by, for example, an interactive computing environment 101, a test selector 140, a model generation system 146, or a user computing system 110, among others. Although any number of systems, in whole or in part, can implement the process 700, to simplify discussion, the process 700 will be described with respect to particular systems. Further, it should be understood that the process 700 may be updated or performed repeatedly over time. For example, the process 700 may be repeated once per month, with the addition or release of a new video game, an update to a game engine, a threshold number of modifications to a video game under development, or the identification of new KPIs of interest. However, the process 700 may be performed more or less frequently.

The process 700 begins at block 702 where the model generation system 146 receives historical data 652 comprising KPI data and/or the identity of tests performed on one or more video games. The historical data 652 may comprise data for video games that were developed using the same game engine. This historical data 652 may serve as training data for the model generation system 146. Further, the historical data 652 may include video game state information for previously tested video games or iterations of a video game.

At block 704, the model generation system 146 receives control data 556 indicating a desired prediction criteria corresponding to the historical data 652. This control data 556 may indicate one or more features or characteristics for which the model generation system 146 is to determine a model. Alternatively, or in addition, the control data 556 may include a value for the features or characteristics that are associated with the received historical data 652. For example, the control data 556 may identify KPIs that are important to the development of a video game, such as processor utilization, number of frames per second that can be rendered, simultaneous users that can be supported by the video game engagement level, churn rate, or retention rate, as the desired KPIs to be improved or to be tested. In some embodiments, the control data 156 may include multiple KPI metrics to be tested by a tester or test process.

At block 706, the model generation system 146 generates one or more prediction models 660 based on the historical data 652 and the control data 556. The prediction models 660 may include one or more variables or parameters 662 that can be combined using a mathematical algorithm or model generation ruleset 570 to generate a prediction model 660 based on the historical data 652 and, in some cases, the control data 556. Further, in certain embodiments, the block 706 may include applying one or more items of feedback data 554. For example, if the prediction model 660 is generated as part of a supervised machine learning process, a user (for example, an administrator) may provide one or more inputs to the model generation system 146 as the prediction model 660 is being generated and/or to refine the prediction model 660 generation process. For example, the user may be aware that an update was made to a game engine. In such a case, the user may supply feedback data 554 to reduce the weight of a portion of the historical data 552 that may correspond to data supplied for instances of the video game that used the prior version of the game engine. Further, in some cases, one or more of the variables or parameters may be weighted using, for example, weights 664. The value of the weight for a variable may be based at least in part on the impact the variable has in generating the prediction model 660 that satisfies, or satisfies within a threshold discrepancy, the control data 556 and/or the historical data 152. In some cases, the combination of the variables and weights may be used to generate a prediction model 160.

The model generation system 146, at block 708, based at least in part on an accuracy of the prediction model 660 and, optionally, any associated penalty or weighting selects a prediction model 660. In some embodiments, the model generation system 146 selects a prediction model 660 associated with a lower penalty compared to another prediction model 660. However, in some embodiments, the model generation system 146 may select a prediction model associated with a higher penalty if, for example, the output of the prediction model 660 is a threshold degree more accurate than the prediction model associated with the lower penalty. In certain embodiments, the block 708 may be optional or omitted. For example, in some cases, the prediction models 660 may not be associated with a penalty. In some such cases, a prediction model may be selected from a plurality of prediction models based on the accuracy of the output generated by the prediction model or may be selected at random.

Overview of Computing System

Figure 8:
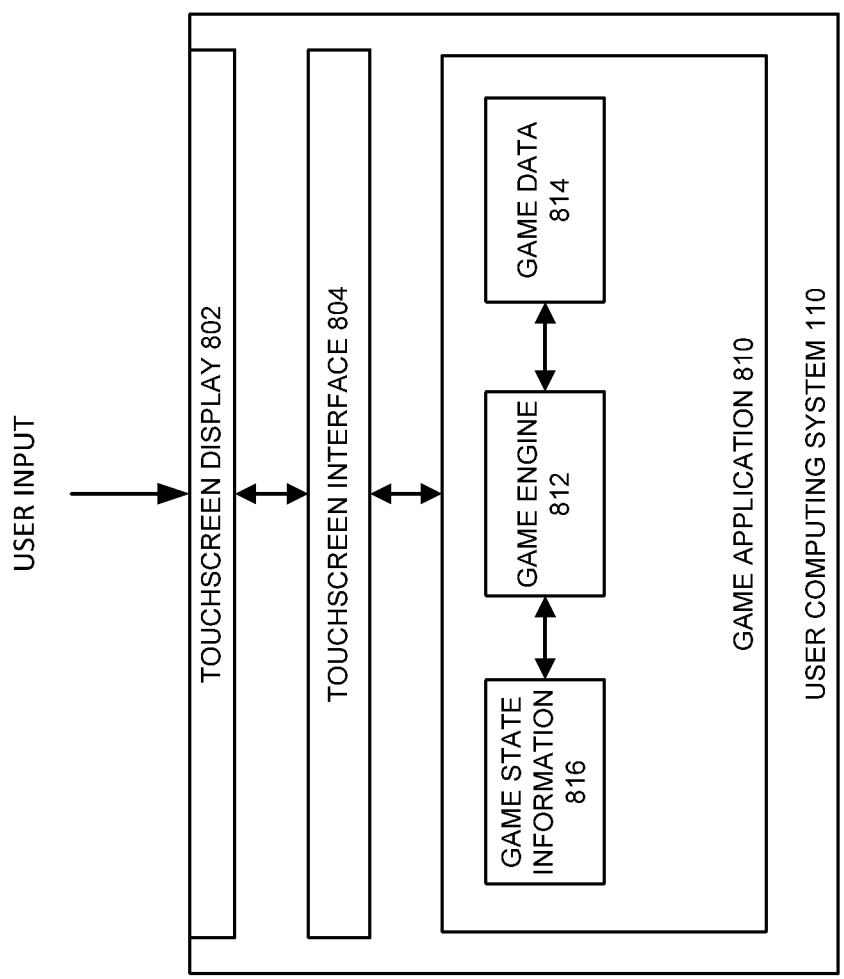
FIG. 8 illustrates an embodiment of a user computing system.

FIG. 8 illustrates an embodiment of a user computing system 110, which may also be referred to as a gaming system. As illustrated, the user computing system 110 may be a single computing device that can include a number of elements. However, in some cases, the user computing system 110 may include multiple devices. For example, the user computing system 110 may include one device that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 8, the user computing system 110 is a touch-capable computing device capable of receiving input from a user via a touchscreen display 802. However, the user computing system 110 is not limited as such and may include non-touch capable embodiments, which do not include a touchscreen display 802.

The user computing system 110 includes a touchscreen display 802 and a touchscreen interface 804, and is configured to execute a game application. This game application 810 may be the video game 112. Although described as a game application 810, in some embodiments the application 810 may be another type of application that may be capable of interacting with multiple users across multiple user computing systems, such as educational software or language software. While user computing system 110 includes the touchscreen display 802, it is recognized that a variety of input devices may be used in addition to or in place of the touchscreen display 802.

The user computing system 110 can include one or more processors, such as central processing units (CPUs), graphics processing units (GPUs), and accelerated processing units (APUs). Further, the user computing system 110 may include one or more data storage elements. In addition, the user computing system 110 may include one or more volatile memory elements, such as random-access memory (RAM). In some embodiments, the user computing system 110 can be a specialized computing device created for the purpose of executing game applications 810. For example, the user computing system 110 may be a video game console. The game applications 810 executed by the user computing system 110 may be created using a particular application programming interface (API) or compiled into a particular instruction set that may be specific to the user computing system 110. In some embodiments, the user computing system 110 may be a general purpose computing device capable of executing game applications 810 and non-game applications. For example, the user computing system 110 may be a laptop with an integrated touchscreen display or desktop computer with an external touchscreen display. Components of an example embodiment of a user computing system 110 are described in more detail with respect to FIG. 8.

The touchscreen display 802 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 802. The touchscreen interface 804 can be configured to translate the touch input into data and output the data such that it can be interpreted by components of the user computing system 110, such as an operating system and the game application 810. The touchscreen interface 804 can translate characteristics of the tactile touch input touch into touch input data. Some example characteristics of a touch input can include, shape, size, pressure, location, direction, momentum, duration, and/or other characteristics. The touchscreen interface 804 can be configured to determine the type of touch input, such as, for example a tap (for example, touch and release at a single location) or a swipe (for example, movement through a plurality of locations on touchscreen in a single touch input). The touchscreen interface 804 can be configured to detect and output touch input data associated with multiple touch inputs occurring simultaneously or substantially in parallel. In some cases, the simultaneous touch inputs may include instances where a user maintains a first touch on the touchscreen display 802 while subsequently performing a second touch on the touchscreen display 802. The touchscreen interface 804 can be configured to detect movement of the touch inputs. The touch input data can be transmitted to components of the user computing system 110 for processing. For example, the touch input data can be transmitted directly to the game application 810 for processing.

In some embodiments, the touch input data can undergo processing and/or filtering by the touchscreen interface 804, an operating system, or other components prior to being output to the game application 810. As one example, raw touch input data can be captured from a touch input. The raw data can be filtered to remove background noise, pressure values associated with the input can be measured, and location coordinates associated with the touch input can be calculated. The type of touch input data provided to the game application 810 can be dependent upon the specific implementation of the touchscreen interface 804 and the particular API associated with the touchscreen interface 804. In some embodiments, the touch input data can include location coordinates of the touch input. The touch signal data can be output at a defined frequency. Processing the touch inputs can be computed many times per second and the touch input data can be output to the game application for further processing.

A game application 810 can be configured to be executed on the user computing system 110. The game application 810 may also be referred to as a video game, a game, game code and/or a game program. A game application should be understood to include software code that a user computing system 110 can use to provide a game for a user to play. A game application 810 might comprise software code that informs a user computing system 110 of processor instructions to execute, but might also include data used in the playing of the game, such as data relating to constants, images and other data structures. For example, in the illustrated embodiment, the game application includes a game engine 812, game data 814, and game state information 816. As previously stated, the embodiments described herein may be used for applications other than video games, such as educational software or videoconferencing. Thus, in some such cases, the game application 810 may be substituted with other types of applications that may involve multiple users communicating over a network and selecting a server, or one of the plurality of user computing systems, to act as a host.

The touchscreen interface 804 or another component of the user computing system 110, such as the operating system, can provide user input, such as touch inputs, to the game application 810. In some embodiments, the user computing system 110 may include alternative or additional user input devices, such as a mouse, a keyboard, a camera, a game controller, and the like. Further, the user computing system 110 may include a virtual reality display and/or an augmented reality display. A user can interact with the game application 810 via the touchscreen interface 804 and/or one or more of the alternative or additional user input devices. The game engine 812 can be configured to execute aspects of the operation of the game application 810 within the user computing system 110. Execution of aspects of gameplay within a game application can be based, at least in part, on the user input received, the game data 814, and game state information 816. The game data 814 can include game rules, prerecorded motion capture poses/paths, environmental settings, constraints, animation reference curves, skeleton models, and/or other game application information. Further, the game data 814 may include information that is used to set or adjust the difficulty of the game application 810.

The game engine 812 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 810, the game application 810 can store game state information 816, which can include character states, environment states, scene object storage, and/or other information associated with a state of execution of the game application 810. For example, the game state information 816 can identify the state of the game application at a specific point in time, such as a character position, character action, game level attributes, and other information contributing to a state of the game application.

The game engine 812 can receive the user inputs and determine in-game events, such as actions, collisions, runs, throws, attacks and other events appropriate for the game application 810. During operation, the game engine 812 can read in game data 814 and game state information 816 in order to determine the appropriate in-game events. In one example, after the game engine 812 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which can generate a new frame for display to the user. The process can be repeated for rendering each frame during execution of the game application. Though the process has been described in the context of a character, the process can be applied to any process for processing events and rendering the output for display to a user.

In some cases, at least some of the video game engine 812 may reside on a server, such as one of the video game servers 152. Further, in some cases, the complete video game engine 812 may reside on the server. Thus, in some cases, the video game engine 812 may be omitted from the portion of the video game application 810 hosted on the user computing system 110. Similarly, in some embodiments, video game state information 816 and video game data 814 may be hosted on a server in addition to or instead of on the user computing system 110. Further, in some cases, actions of the user performed within the video game application 810 may be transmitted to a server that is hosting a portion of the video game 810. The server may compute or determine the result of the user's interaction with respect to the video game application 810, such as collisions, attacks, or movements. The server may then send a result of the user's actions to the video game application 810 on the user computing system 110. The video game application 810 may then perform an action in response to the result, such as displaying the result to the user.

Example Hardware Configuration of Computing System

Figure 9:
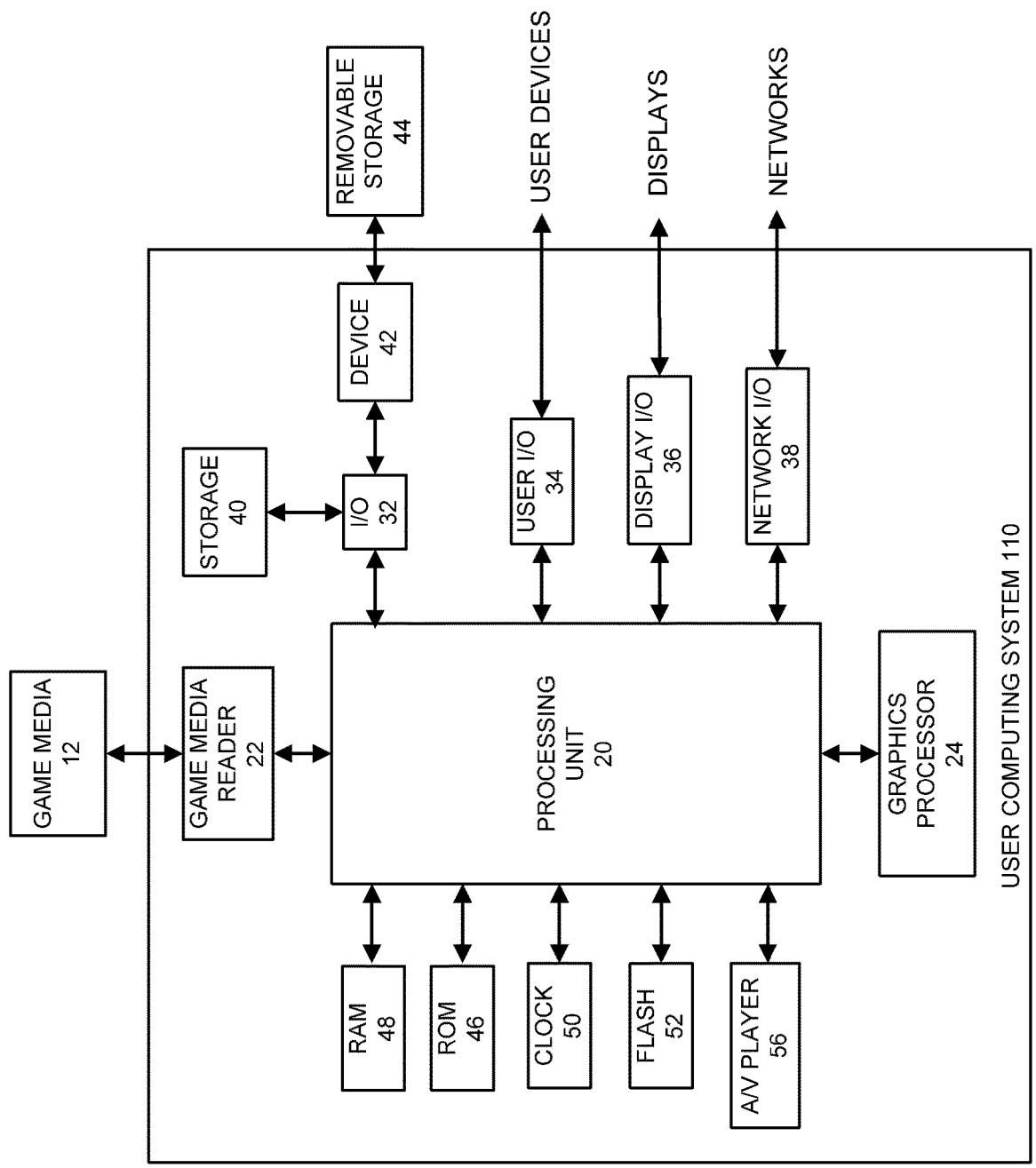
FIG. 9 illustrates an embodiment of a hardware configuration for the user computing system of FIG. 8.

FIG. 9 illustrates an embodiment of a hardware configuration for the user computing system 110 of FIG. 8. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 9) as described with respect to FIG. 8, the user computing system 110 may optionally include a touchscreen display 802 and a touchscreen interface 804.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for the user computing system 110. Processing unit 20 can communicate through I/O 32 to store data, such as game state data and any shared data files. In addition to storage 40 and removable storage media 44, the user computing system 110 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the user computing system 110 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the user computing system 110.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by an interactive computing system configured with specific computer-executable instructions,
receiving a byte stream for a test session of a video game, the test session of the video game generating a first volume of data exceeding a threshold quantity, and associated with an execution of an instance of the video game;
decoding a portion of the byte stream into a data object, the data object comprising data encapsulating an event associated with the execution of the instance of the video game;
determining that the data object corresponds to a key performance indicator;
generating a plurality of prediction models by using as training data historical data associated with the key performance indicator, the historical data including a data portion associated with execution of one or more of a plurality of additional test sessions of the video game on an older version of a video game engine than a version of the video game engine on which the test session was executed;
refining generation of the plurality of prediction models by reducing a weight of at least one weighted parameter associated with the data portion of the historical data corresponding to the older version of the video game engine in response to receiving user feedback to reduce the weight, thereby decreasing impact of the data portion of the historical data on the generation of the plurality of prediction models;
aggregating the data object with additional data objects decoded from the byte stream that correspond to the key performance indicator to obtain a first set of aggregated data objects, the first set of aggregated data objects associated with a second volume of data that is smaller than and is a subset of the first volume of data, the second volume of data not exceeding the threshold quantity;
evaluating the first set of aggregated data objects against a trend generated from an occurrence of the plurality of additional test sessions of the video game;
in response to determining that the first set of aggregated data objects does not satisfy the trend, selecting a first test procedure based at least in part on a result of said evaluating as an active test procedure to be applied to the video game, wherein selecting the first test procedure comprises:
applying the plurality of prediction models to the first set of aggregated data objects, each prediction model having weighted parameters and each prediction model configured to output a particular test procedure;
selecting, using an automated test selector and without user input, a first prediction model from the plurality of prediction models, wherein the automated test selector is configured to select, without user input, different prediction models from the plurality of prediction models, and wherein the automated test selector is generated based at least in part on a machine learning algorithm configured to select as the first prediction model a prediction model associated with a highest accuracy of generated output of the plurality of prediction models; and
using the particular test procedure output by the first prediction model as the active test procedure;
performing the active test procedure on the video game automatically and without user input, wherein performing the active test procedure comprises:
modifying code corresponding to the video game; and
initiating another test session of the video game using the modified code of the video game; and in response to determining that a second set of aggregated data objects determined for the first test procedure does not satisfy the trend:
repeating the selecting to select a second test procedure different from the first test procedure, wherein selecting the second test procedure comprises selecting from the plurality of prediction models a second prediction model associated with a next highest accuracy of generated output; and
performing the second test procedure on the video game automatically and without user input.

2. The computer-implemented method of claim 1, wherein said decoding of the portion of the byte stream occurs as one or more additional portions of the byte stream are being received.

3. The computer-implemented method of claim 1, wherein decoding the portion of the byte stream into the data object comprises decoding the portion of the byte stream into a human-readable format.

4. The computer-implemented method of claim 1, wherein evaluating the first set of aggregated data further comprises:
determining, based at least in part on the first set of aggregated data objects, a value corresponding to the key performance indicator, the value comprising a statistical value generated from the first set of aggregated data objects; and
comparing the value to the trend.

5. The computer-implemented method of claim 1, wherein the active test procedure comprises:
modifying data supplied to the video game during execution of the video game; and
initiating a second test session of the video game using the modified data.

6. The computer-implemented method of claim 1, wherein applying the plurality of prediction models to the first set of aggregated data objects comprises evaluating the first set of aggregated data objects with a parameter function generated based at least in part on an additional machine learning algorithm.

7. The computer-implemented method of claim 1, wherein the event comprises a utilization of at least a portion of a computing resource in response to one or more operations performed by the video game during execution of the test session of the video game.

8. The computer-implemented method of claim 1, wherein the key performance indicator comprises a metric associated with utilization of a computing resource during the execution of the instance of the video game.

9. The computer-implemented method of claim 1, wherein the data object and the additional data objects correspond to utilization of a particular computing resource during the execution of the instance of the video game.

10. The computer-implemented method of claim 1, further comprising:
aggregating the first set of aggregated data objects with data objects generated from additional test sessions of the video game to obtain multi-session aggregated data; and
selecting the active test procedure based at least in part on the multi-session aggregated data.

11. A system comprising:
an electronic data store configured to store data objects corresponding to key performance indicator data; and
an interactive computing system comprising one or more hardware processors, the interactive computing system configured to execute specific computer-executable instructions to at least:
receive a byte stream for a test session of a video game, the test session of the video game associated with an execution of an instance of the video game;
decode a portion of the byte stream into a data object, the data object comprising data encapsulating an event associated with the execution of the instance of the video game;
determine that the data object corresponds to a key performance indicator;
generate a plurality of prediction models by using as training data historical data associated with the key performance indicator, the historical data including a data portion associated with execution of one or more of a plurality of additional test sessions of the video game on an older version of a video game engine than a version of the video game engine on which the test session was executed;
refine generation of the plurality of prediction models by reducing a weight of at least one weighted parameter associated with the data portion of the historical data corresponding to the older version of the video game engine in response to receiving user feedback to reduce the weight, thereby decreasing impact of the data portion of the historical data on the generation of the plurality of prediction models;
store the data object at the electronic data store;
aggregate the data object with additional data objects stored at the electronic data store that correspond to the key performance indicator to obtain a first set of aggregated data objects;
generate a user interface element based at least in part on the set of aggregated data objects;
output the user interface element for display to a user;
evaluate the first set of aggregated data objects against a trend generated from an occurrence of the plurality of additional test sessions of the video game;
in response to a determination that the first set of aggregated data objects does not satisfy the trend, select a first test procedure based at least in part on a result of said evaluating by at least:
applying the plurality of prediction models to the first set of aggregated data objects, each prediction model having weighted parameters and each prediction model configured to output a particular test procedure;
selecting, using an automated test selector and without user input, a first of the prediction models from the plurality of prediction models, wherein the automated test selector is configured to select, without user input, different prediction models from the plurality of prediction models, and wherein the automated test selector is generated based at least in part on a machine learning algorithm configured to select the first prediction model as a prediction model associated with a highest accuracy of generated output of the plurality of prediction models; and
using the particular test procedure output by the first prediction model as the test procedure;
perform the test procedure on the video game by:
modifying code corresponding to the video game; and initiating another test session of the video game using the modified code of the video game; and in response to a determination that a second set of aggregated data objects determined for the first test procedure does not satisfy the trend:

repeat the selecting to select a second test procedure different from the first test procedure, wherein selecting the second test procedure comprises selecting from the plurality of prediction models a second prediction model associated with a next highest accuracy of generated output; and perform the second test procedure on the video game.

12. The system of claim 11, wherein the interactive computing system is further configured to evaluate the first set of aggregated data objects by at least:

determining, based at least in part on the first set of aggregated data objects, a statistical value corresponding to the key performance indicator; and determining whether the statistical value satisfies the trend.

13. The system of claim 11, wherein the interactive computing system is further configured to perform the selected test procedure by at least:

obtaining a modified test environment by modifying code corresponding to the video game, modifying data accessed by the video game, or modifying computing resources available to the video game; and initiating a second test session of the video game using the modified test environment.

14. The system of claim 11, wherein applying the plurality of prediction models to the first set of aggregated data objects comprises evaluating the first set of aggregated data objects with a parameter function generated based at least in part on an additional machine learning algorithm.

15. The system of claim 11, wherein the event corresponds to generation of a frame of video output by the video game.

16. The system of claim 11, wherein the key performance indicator comprises a metric associated with performance of the instance of the video game with respect to computing resources available to the instance of the video game.

17. A non-transitory computer-readable storage medium storing computer executable instructions that, when executed by one or more computing devices, configure the one or more computing devices to perform operations comprising:

receiving a byte stream for a test session of a video game, the test session of the video game associated with an execution of an instance of the video game;

decoding a portion of the byte stream into a data object, the data object comprising data encapsulating an event associated with the execution of the instance of the video game, wherein decoding the portion of the byte stream into the data object transforms data from a machine-readable format to a human-readable format;

determining that the data object corresponds to a key performance indicator;

generating a plurality of prediction models by using as training data historical data associated with the key performance indicator, the historical data including a data portion associated with execution of one or more of a plurality of additional test sessions of the video game on an older version of a video game engine than a version of the video game engine on which the test session was executed;

refining generation of the plurality of prediction models by reducing a weight of at least one weighted parameter associated with the data portion of the historical data corresponding to the older version of the video game engine in response to receiving user feedback to reduce the weight, thereby decreasing impact of the data portion of the historical data on the generation of the plurality of prediction models;

aggregating the data object with additional data objects that correspond to the key performance indicator to obtain a first set of aggregated data objects;

outputting the first set of aggregated data objects as a performance metric corresponding to performance of the test session of the video game;

evaluating the first set of aggregated data objects against a trend generated from an occurrence of the plurality of additional test sessions of the video game;

in response to determining that the first set of aggregated data objects does not satisfy the trend, selecting a first modified test procedure based at least in part on a result of said evaluating, wherein selecting the first modified test procedure comprises:

applying the plurality of prediction models to the set of aggregated data objects, each prediction model having weighted parameters and each prediction model configured to output a particular test procedure;

selecting, using an automated test selector and without user input, a particular prediction model from the plurality of prediction models, wherein the automated test selector is configured to select, without user input, different prediction models from the plurality of prediction models, and wherein the automated test selector is generated based at least in part on a machine learning algorithm configured to select as the particular prediction model a prediction model associated with a highest accuracy of generated output of the plurality of prediction models;

using the particular test procedure output by the particular prediction model as the first modified test procedure; and performing the first modified test procedure on the video game by:

modifying code corresponding to the video game; and initiating another test session of the video game using the modified code of the video game; and in response to determining that a second set of aggregated data objects determined for the first modified test procedure does not satisfy the trend:

repeating the selecting to select a second modified test procedure different from the first modified test procedure, wherein selecting the second modified test procedure comprises selecting from the plurality of prediction models a second prediction model associated with a next highest accuracy of generated output; and performing the second modified test procedure on the video game.

* * * * *